United States Patent
Nomura et al.

[11] Patent Number: 5,950,045
[45] Date of Patent: Sep. 7, 1999

[54] INPUT DEVICE

[75] Inventors: Tatsuo Nomura, Soraku-gun; Kohki Fukuda, Nara; Syoichiro Yoshiura, Tenri; Yasuhiro Nakai; Kazuyuki Ohgita, both of Soraku-gun; Hotaka Isobe, Yamatokoriyama; Hiranaga Yamamoto, Nara, all of Japan

[73] Assignee: Sharp Kabushiki Kaisha, Osaka, Japan

[21] Appl. No.: 09/095,077

[22] Filed: Jun. 10, 1998

[30] Foreign Application Priority Data

Jun. 20, 1997 [JP] Japan .................................. 9-163887
Oct. 24, 1997 [JP] Japan .................................. 9-292920
Oct. 31, 1997 [JP] Japan .................................. 9-301128

[51] Int. Cl.$^6$ .................................................. G03G 15/00
[52] U.S. Cl. .............................. 399/81; 399/82; 399/83; 345/326; 345/327
[58] Field of Search .................................. 399/81, 82, 83, 399/85, 86, 87; 345/326, 327, 173

[56] References Cited

U.S. PATENT DOCUMENTS 5,045,880 9/1991 Evanitsky et al. .......................... 399/82
5,390,005 2/1995 Kimoto et al. .
5,434,650 7/1995 Nakahara et al. .......................... 399/82
5,565,964 10/1996 Tashiro et al. ............................ 355/210
5,815,770 9/1998 Ogino .......................................... 399/87

FOREIGN PATENT DOCUMENTS 442851 10/1992 Japan .
635282 2/1994 Japan .

*Primary Examiner*—R. L. Moses
*Assistant Examiner*—Shival Virmani

[57] ABSTRACT

The input device for controlling an apparatus includes: a display device for displaying an image represented by a plurality of dots; a touch panel disposed over the display face of the display device for outputting information of a position where the panel is operated in accordance with the displayed image on the display device; a command content determining device for determining the content of the command selected, based on the relationship between the positional information output from the touch panel and the image displayed on the display device, wherein the image displayed on the display device includes an external outline of the apparatus having the input device; and a switching device for switching the display on the display device, into the display frame for setting the operation of a unit corresponding to the operated part of the external outline of the apparatus when part of the external outline of the apparatus displayed on the display portion is operated through the touch panel.

35 Claims, 23 Drawing Sheets

FIG.9A
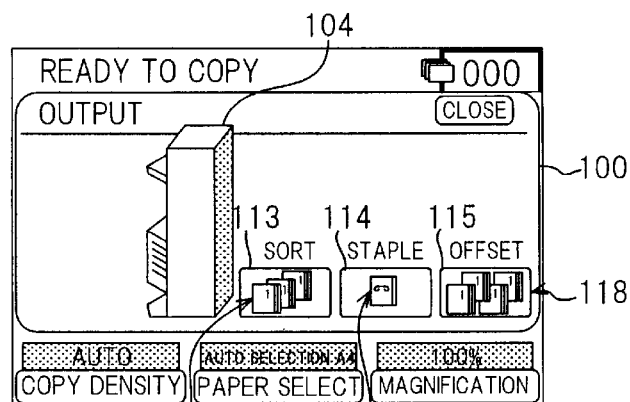
FIG.9B
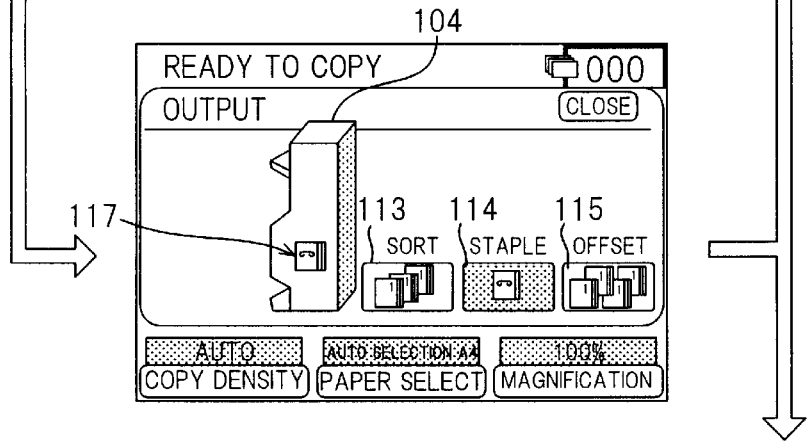
FIG.9C
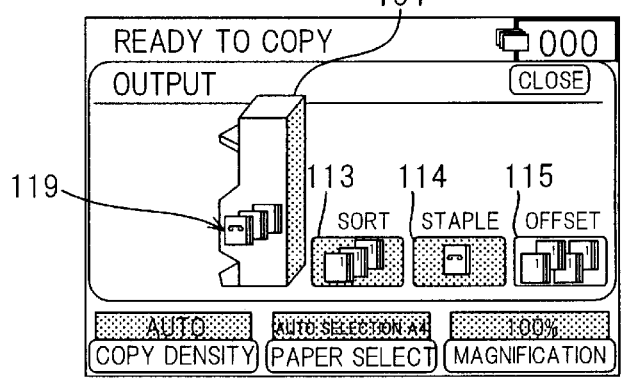
FIG.9D

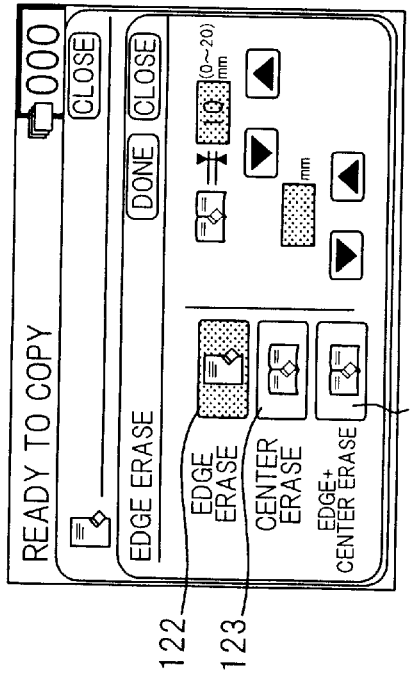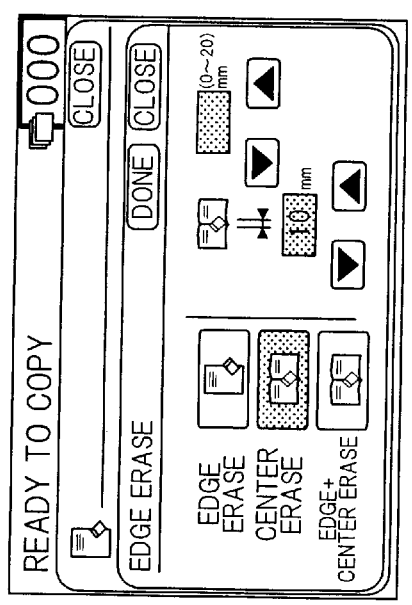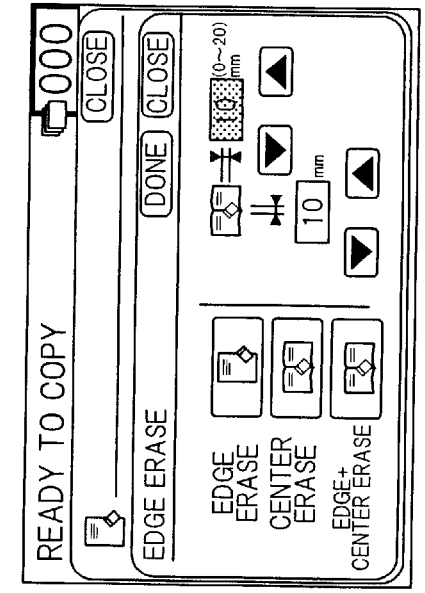

(Note)This figure is originally written in Japanese (here translated into English).

FIG.20
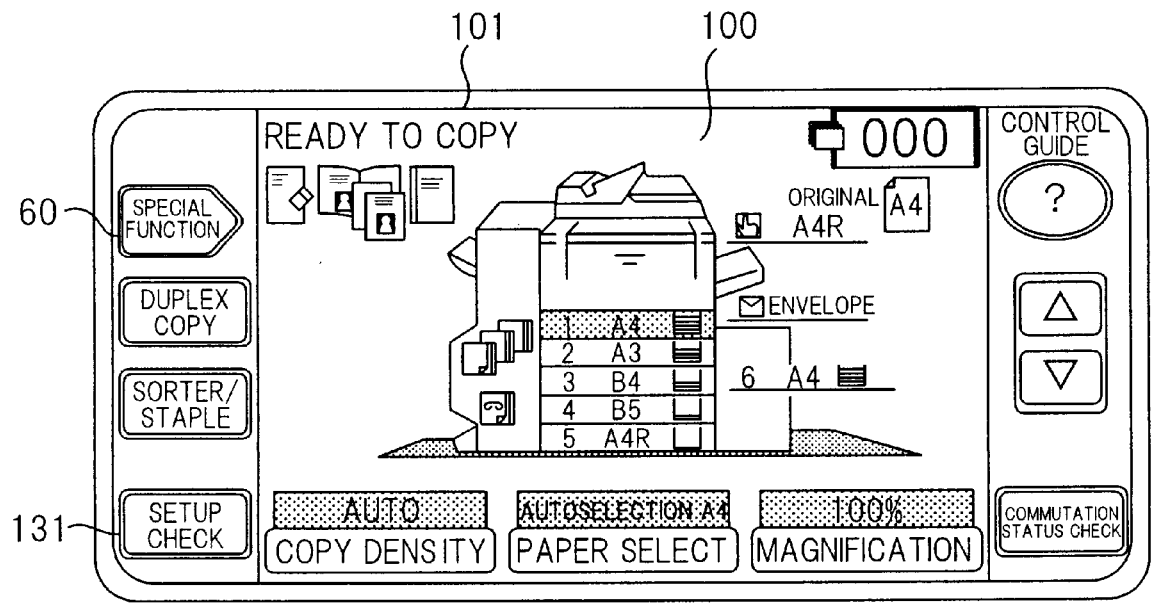
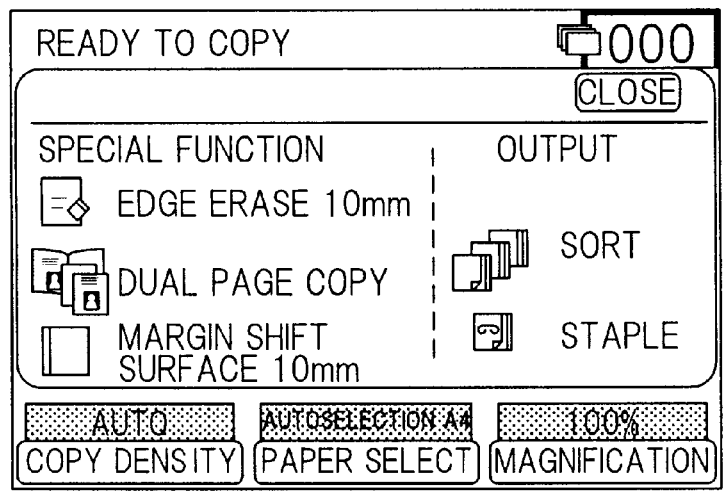

INPUT DEVICE

BACKGROUND OF THE INVENTION

(1) Field of the Invention

The present invention relates to an input control device for control which allows the operator to set up commands relating the operation of an appliance.

(2) Description of the Prior Art

For conventional image forming apparatuses such as digital copiers, a system has been proposed which has the functions of subjecting an original image captured through the scanner, to a certain processing which was selected from a variety of image processing functions and outputting the processed image through the printer unit, and/or post-processing the output materials in various manners to produce a compiled documents.

The control panel for such a digital copier needed many keys arranged thereon because of the various functions, resulting in complexity and making it difficult to handle from operability viewpoint.

In recent digital copiers, there has been a tendency that keys which are less frequently used are lidded or some keys are shared having multiple purposes. However, this configuration may not be still adequate, so a display input control device which is composed of combination of a liquid crystal display portion and a transparent touch-panel has been frequently used recently. One example is found in Japanese Patent Application Laid-Open Hei 6 No. 35,282. Now, based on the example disclosed in this publication, the prior art in the field of the copiers having a conventional touch panel will be briefly described.

The LCD screen (liquid crystal display screen) displays various pieces of information such as the status of the copier, the contents of the instructions as to the copy operation designated by the operator, the message from the copier to the operator, etc. Based on these pieces of information, the operator can make necessary operational commands to the copier. That is, the operator only needs to lightly touch the LCD screen on desired touch keys of the optional command keys displayed on the LCD screen in order to make an instruction as to the desired operation. Therefore, a touch panel is provided on the LCD screen so that the contents displayed on the LCD screen with the optional command keys can be input to the copier.

The display on this LCD screen is adapted to change successively by the operator's instructions or due to the operating state of the copier. This configuration aims at eliminating command keys unrelated to the current status of the copier as much as possible by successive switching of displays suitable to the status of the copier.

For example, the display disclosed in Japanese Patent Application Laid-Open Hei 6 No. 35,282, has many mode selection keys (input through touch panel) arranged on the peripheral part of the LCD screen in order to display many pieces of information within the limited display area on the LCD screen. Thus, upon operating the mode selection keys, the display on the LCD frame is switched to a desired mode.

This configuration allows an inexperienced user to select a desired mode from the mode selection keys arranged on the peripheral part of the LCD screen. Then, the operator, successively chooses the required mode following the interactive change of the display of the copier. In this way, it is possible for the user of the copier to easily operate the copier, even one which has various complicated processing functions.

However, in some cases, a copier having the thus configured input device cannot present good operability, or the display content displayed on the LCD screen may be hard to understand.

Illustratively, a person who is familiar with the copier will need quite a long time and too many complex steps to reach the desired mode on the LCD screen in order to set up a necessary operation. That is, successive displays on the LCD screen aiming at easy selection, inversely, result in inconvenience. Further, there is another big problem that successive changes of the LCD frames causes the operator to easily forget the conditions of the copy mode selected on the previous LCD frames. In such a case, the operator must go back to the previous frames on the LCD screen to confirm the status, resulting in wasted time during mode setup.

Whenever the content on the LCD screen is changed upon the instruction from the control portion, a content different from that shown in the previous display frame will be displayed on the LCD screen. The operator, after viewing and grasping all the display content, should make a next command.

Some multi-functionality copiers have an control guiding means such as a help key on the control panel for illustrating the functions so that when user gets lost and cannot set up the operation, it displays the required guidance information to help the user to make the correct commands.

This technique is disclosed, for example, in Japanese Utility Model Publication Hei 4 No. 42,851. This configuration only displays brief guidance about the way of control and what the keys indicates for unknown keys. Therefore, when the help key is operated during the setup of a desired mode (function), an inexperienced user may rather become confused, giving rise to operating problems.

Thus, even if the manufacturer intended to design easily understandable frames, no input device having perfect operability has yet to appear from a user's viewpoint.

SUMMARY OF THE INVENTION

It is therefore an object of the present invention to provide an input device which has a control portion composed of a display portion and a touch panel for an operator to input commands to the apparatus and has a simple configuration which allows both inexperienced and experienced users to easily understand how to operate and input the desired commands to the apparatus.

It is another object of the invention to provide an input device which allows an operator to check their selected mode all the time, even when the display changes successively by the commands of the operator, and further does not need the operator to change their view point every time the display frame changes to another.

It is a further object of the invention to provide an easy understandable display input control device wherein a clear guidance display is provided for an operator during the setting of the operation of a desired mode (function) if the operator does not know how the function works or how to set up the function, and the display will not be changed excessively so as to allow the operator to select the mode through the current display if the operator having understood the function still needs to select the mode, thus avoiding operator confusion.

In order to achieve the above objects, the present invention is configured as follows:

In accordance with the first aspect of the invention, an input device for controlling an apparatus comprises:

a display means for displaying an image represented by a plurality of dots;

a touch panel means disposed over the display face of the display means for outputting information of a position where the panel is operated in accordance with the displayed image on the display means;

a command content determining means for determining the content of the command selected, based on the relationship between the positional information output from the touch panel means and the image displayed on the display means, wherein the image displayed on the display means comprises an external outline of the apparatus having the input device; and a switching means for switching the display on the display means, into the display frame for setting the operation of a unit corresponding to the operated part of the external outline of the apparatus when part of the external outline of the apparatus displayed on the display portion is operated through the touch panel means.

In accordance with the second aspect of the invention, the input device having the above first feature is characterized in that the switching means is constructed so that when part of the external outline of the apparatus displayed on the display portion is operated through the touch panel means, the outline of the designated part constituting the apparatus continues to be displayed while the display in the display means changes into the display frame for setting the operation mode of the unit corresponding to the operated part of the external outline in the apparatus.

In accordance with the third aspect of the invention, the input device having the above second feature is characterized in that when part of the external outline of the apparatus displayed on the display portion is operated through the touch panel means, the outline of the designated part constituting the apparatus continues to be displayed while the display in the display means changes into the display frame for setting the operation mode of the unit corresponding to the operated part of the external outline in the apparatus.

In accordance with the fourth aspect of the invention, the input device having the above second feature, further comprises a display indicating means which, when the operation of the part of the unit displayed on the display means is designated, displays the icon representing the designated mode, within the outline of the unit displayed on the display means or in the vicinity thereto.

In accordance with the fifth aspect of the invention, an input device for controlling an apparatus comprises:

a display means for displaying an image represented by a plurality of dots;

an operation command inputting means for inputting commands relating to the operation; and a display control means for displaying the command input through the operation command inputting means, on the display means so that the command can be confirmed, wherein the image displayed on the display means comprises an external outline of the apparatus having the input device, and in accordance with the command relating to the operation, input through the operation command inputting means, the mode's icon relating to the designated operation is displayed within the outline of the unit displayed on the display means or in the vicinity thereto.

In accordance with the sixth aspect of the invention, the input device having the above fifth feature is characterized in that the means for inputting a commands relating to an operation comprises an icon representing the operation, and when the means for inputting the command relating to the operation is operated, the same icon representing the operation is displayed within the outline of the unit displayed on the display means or in the vicinity thereto.

In accordance with the seventh aspect of the invention, the input device having the above fifth feature is characterized in that when an icon relating to a mode is displayed on the display means within the external outline or in the vicinity thereto, the icon is displayed in the position suitable to the mode, within the external outline.

In accordance with the eighth aspect of the invention, the input device having the above fifth feature is characterized in that when the operation relating to a unit of the apparatus displayed on the display means is designated, the icon representing the setup mode is displayed within the outline of the unit displayed on the display means or in the vicinity thereto and if a plurality of icons representing the setup modes associated with each other need to be displayed, the associated icons are replaced with a single icon.

In accordance with the ninth aspect of the invention, the input device having the above fifth feature is characterized in that when the operation relating to a unit of the apparatus displayed on the display means is designated, the icon representing the setup mode is displayed within the outline of the unit displayed on the display means or in the vicinity thereto; and when a plurality of icons representing the setup modes are displayed beyond the predetermined display area within the outline or in the vicinity thereto, icons of the modes associated with each other of the plurality of the icons are replaced with another single icon.

In accordance with the tenth aspect of the invention, the input device having the above second feature is characterized in that when the operating conditions of the part of the apparatus displayed on the display means have been designated, the external outline of the part of the apparatus displayed on the display means continues to be displayed at the same position while display changes into the frame that displays the overall external outline of the whole apparatus.

In accordance with the eleventh aspect of the invention, the input device having the above second feature is characterized in that when the operating conditions of the part of the apparatus displayed on the display means have been designated, the external outline of the part of the apparatus displayed on the display means and the icon representing the selected mode continue to be displayed at the same positions while display changes into the frame that displays the overall external outline of the whole apparatus.

In accordance with the twelfth aspect of the invention, an input device for controlling an apparatus comprises:

a display means for displaying an image represented by a plurality of dots;

a touch panel means disposed over the display face of the display means for outputting information of a position where the panel is operated in accordance with the displayed image on the display means; and a command content determining means for determining the content of the command selected, based on the relationship between the positional information output from the touch panel means and the image displayed on the display means, wherein the image displayed on the display means comprises an external outline of the apparatus having the input device;

a first switching means which has an input portion disposed on the periphery of the external outline of the apparatus displayed on the display portion, and when the input portion is operated, switches the display on the display means into the display frame for setting the operation of a unit corresponding to the operated part in the input portion; and a second switching means for switching the display on the display means, into the display frame for setting the operation of a unit corresponding to the operated part of the external outline of the apparatus when part of the external outline of the apparatus displayed on the display portion is operated through the touch panel means.

In accordance with the thirteenth aspect of the invention, a display input control system comprises:

a display device for displaying an image composed of an external outline of an apparatus to be operated, command keys for designating operating commands and icons representing the command contents of the control operations;

a position detecting device for detecting the designated position when the image displayed on the display device is operated by an operator; and a controller for displaying a predetermined frame on the display device, said controller comprising:

an image determining means for determining the image displayed on the designated position from the positional information output from the position detecting means;

a command content determining means for determining the content of the control operation for the designated image; and a display control means for displaying the icon corresponding to the command content determined by the command content determining means, either in the first display area which is in the vicinity of the external outline of the portion relating to the command content, or in the second display area which is in the external outline thereof.

In accordance with the fourteenth aspect of the invention, the display input control device having the above thirteenth feature is characterized in that the display control means, in accordance with the command contents for icons, displays the icons relating to the command contents, altogether in the first or second display area.

In accordance with the fifteenth aspect of the invention, the display input control device having the above thirteenth feature is characterized in that the display control means effects control so that the icon relating to the command content determined by command content determining means is displayed at the predetermined position and if the display is switched from one frame to another for each control operation the icon is continued to be displayed in the same state before and after the switching of the display.

In accordance with the sixteenth aspect of the invention, the display input control device having the above thirteenth feature is characterized in that the display control means is constructed so that the spacing between icons can be changed.

In accordance with the seventeenth aspect of the invention, the display input control device having the above thirteenth feature is characterized in that the display control means is constructed so that the size of icons can be changed.

In accordance with the eighteenth aspect of the invention, the display input control device having the above thirteenth feature is characterized in that the display control means is constructed so that the displayed icons and the command contents represented by the icons are displayed in menu form.

In accordance with the nineteenth aspect of the invention, the display input control device having the above eighteenth feature is characterized in that the display control means is constructed so that the displayed icons are grouped for individual areas and displayed on the display device in menu form.

In accordance with the twentieth aspect of the invention, the display input control device having the above thirteenth feature is characterized in that the image determining means determines the icon detected by the position detecting means; the command content determining means determines the control command content associated with the determined icon; and the display control means displays the frame for setting up the conditions of the command corresponding to the determined icon.

In accordance with the twenty-first aspect of the invention, the display input control device having the above thirteenth feature is characterized in that the display control means further comprises a control command modifying means for modifying the set up contents of control commands corresponding to icons.

In accordance with the twenty-second aspect of the invention, the display input control device having the above eighteenth feature is characterized in that the display control means further comprises a control command modifying means for modifying the set up contents of control commands corresponding to icons.

In accordance with the twenty-third aspect of the invention, the display input control device having the above nineteenth feature is characterized in that the display control means further comprises a control command altering means for altering the set up contents of control commands corresponding to icons.

In accordance with the twenty-fourth aspect of the invention, a display input control device comprises:

a display means for displaying display image information represented by a plurality of dots;

a position detecting means for detecting the operated position when the image displayed on the display device is operated by an operator; and a command content determining means for determining the content of the control command based on the relationship between the display image information and the information of the operated position, wherein the display image information displayed on the display means comprises guidance information relating to a function and the guidance information displayed on the display means contains the displayed information for selection keys which enable the selection of a function which can be obtained from the guidance information.

In accordance with the twenty-fifth aspect of the invention, the display input control device having the above twenty-fourth feature is characterized in that the display information for selection keys is displayed at the end of the guidance information.

In accordance with the twenty-sixth aspect of the invention, the display input control device having the above twenty-fourth feature further comprises a display frame scrolling means for scrolling the display image information displayed on the display frame of the display means, in the predetermined direction, wherein when the guidance information has been scrolled to the end by the display frame scrolling means, the display automatically changes to the function selecting frame.

In accordance with the twenty-seventh aspect of the invention, the display input control device having the above twenty-fourth feature further comprises a display frame scrolling means for scrolling the display image information displayed on the display frame of the display means, in the predetermined direction, wherein the function as to which the guidance information is being displayed on the display means is automatically selected by the display frame scrolling means.

In accordance with the twenty-eighth aspect of the invention, the display input control device having the above twenty-fourth feature is characterized in that when a function is selected from a plurality of different functions, the icon representing that the function is being selected is displayed at the predetermined position on the display frame of the display means, and at the same time the guidance information of the function is displayed.

In accordance with the twenty-ninth aspect of the invention, a display input control device comprises:

a display means for displaying display image information represented by a plurality of dots;

a position detecting means for detecting the operated position when the image displayed on the display device is operated by an operator; and a command content determining means for determining the content of the control command based on the relationship between the display image information and the information of the operated position, wherein the display image information displayed on the display means comprises guidance information relating to a function and the icon representing the function associated with the guidance information, and the function can be selected by operating the icon.

In accordance with the thirtieth aspect of the invention, the display input control device having the above twenty-eighth feature is characterized in that the display of the icon representing the function, displayed with the guidance information is transferred to the predetermined display area when the function is selected on the display frame.

In accordance with the thirty-first aspect of the invention, the display input control device having the above twenty-ninth feature is characterized in that the display of the icon representing the function, displayed with the guidance information is transferred to the predetermined display area when the function is selected on the display frame.

In accordance with the thirty-second aspect of the invention, the display input control device having the above twenty-fourth feature is characterized in that when the display image information displayed on the display frame of the display means contains plural pieces of guidance display information relating to different functions and selecting key information representing the functions, the display frame is changed in part so as to display the fact that the function has been selected instead of changing the whole display into another when one of the functions is selected by operation of the selection key.

In accordance with the thirty-third aspect of the invention, the display input control device having the above twenty-ninth feature is characterized in that when the display image information displayed on the display frame of the display means contains plural pieces of guidance display information relating to different functions and selecting key information representing the functions, the display frame is changed in part so as to display the fact the function has been selected instead of changing the whole display into another when one of the functions is selected by operation of the selection key.

In accordance with the thirty-fourth aspect of the invention, the display input control device having the above twenty-ninth feature is characterized in that when, with the guidance information being displayed on the display frame of the display means, the function has been selected, the display frame for guidance information is changed into the frame for setting up the detailed conditions of the function if extra setting of detailed conditions is needed for the selected function.

In accordance with the thirty-fifth aspect of the invention, a display input control device comprises:

a display means for displaying display image information represented by a plurality of dots;

a position detecting means for detecting the operated position when the image displayed on the display device is operated by an operator; and a command content determining means for determining the content of the control command based on the relationship between the display image information and the information of the operated position, wherein the display image information displayed on the display means comprises information of functions displayed in menu form and the ways of selecting functions include the first function selecting mode in which a desired function is directly selected from the display information of the function menu and the second function selecting mode in which a desired mode is selected after having viewed the guidance information of the function, selected from the display information of the function menu.

In the display input control device according to the invention, the operator can visually recognize the state of operation and mode setting by referring the actual machine's configuration. The operator can visually confirm that the setting has been certainly accepted by the machine since the input system displays the feedback of the operator's setting on the display. Further, the operator can see the icons etc., without moving their view point on the display even when the display successively changes from one to another, thus visually confirm the fact that the setting of their own in the pervious frame is maintained. Moreover, since the icon displayed is set up when a control instruction is given by the operator, this configuration produces a circumstance under which the operator can easily understand what the icon indicates. As a result, the operator can grasp the setup content and hence effect the copying operation efficiently.

Since the operator can directly press or operate the icons, displayed in the predetermined display area in the basic frame etc., relating to the currently set up modes, the operator can directly access to the frame for detailed setting from which the operator can instantaneously view what the icon indicates and check the detailed conditions of the current mode. Therefore, the operator can not only grasp the content but also easily modify the setting of the currently set up mode. Thus, the operator will not perceive uneasy feeling during the setting control through the touch panel which produce many active motions, and hence is able to easily effect the setting and recognition and modification of control commands to the apparatus.

In accordance with the invention, the operator can view each function using the guidance information and can set up the function through selection keys immediately after checking the function. Accordingly, it is possible for an user, who does not understand how to use the copier very well, to efficiently use the functions in the apparatus. Further, since the icon is displayed together with the its guidance information and the icon functions as the function selecting keys, this configuration helps an inexperienced user to understand the effect of the function and what the icon indicates.

Further, the ways of selecting functions include the first function selecting mode in which a desired function is directly selected from the display information of the function menu and the second function selecting mode in which a desired mode is selected after having viewed the guidance information of the function, selected from the display information of the function menu. Therefore, an experienced user who has been accustomed to use the copier routinely can select the desired mode from various functions, correctly and quickly. On the other hand, an inexperienced user can select the desired mode by checking the contents of functions and understanding the mode step by step.

BRIEF DESCRIPTION OF THE DRAWINGS

FIGS. 9A to 9D are diagrams showing the changes during the setting of the output mode;

FIGS. 15C, 15C1 and 15C2 are diagrams showing the display changes into the detail setup frame when the center erasing key and edge+center erasing key are operated, respectively;

FIG. 20 is a diagram showing display changes when the setup checking key is pressed;

DESCRIPTION OF THE PREFERRED EMBODIMENTS

The embodiment of the invention will hereinafter be described with reference to the accompanying drawings.

Figure 1:
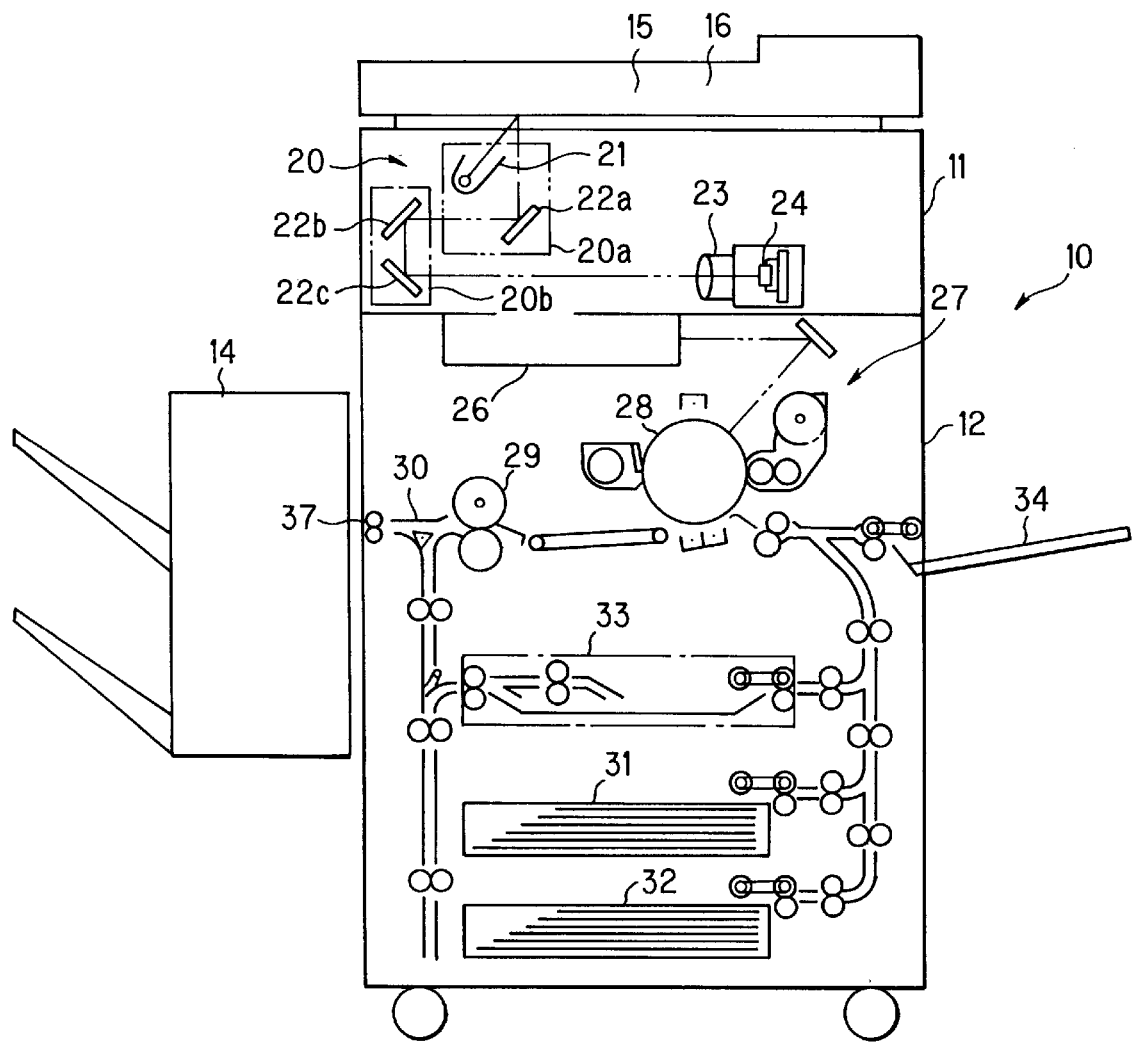
FIG. 1 is a sectional view showing the overall configuration of a digital copier having a control panel.

The embodiment comprises, for example, a digital image forming apparatus having a copy mode, printer mode, facsimile mode etc. FIG. 1 is a sectional view showing the overall configuration of a digital image forming apparatus having a control panel. This image forming apparatus is a digital copier 10, which is mainly composed of a scanner portion 11 and a laser recording portion 12.

Scanner portion 11 comprises an original table 15 made up of transparent glass; a reversible automatic document feeder (RADF) 16 automatically feeding originals to original table 15, and a scanner unit 20 or original image reading unit for scanning the image of the original placed on original table 15 to capture the original image. The original image captured by scanner portion 11 is sent in the form of image data to the image data input portion, which will be described later, where the image data is subjected to the designated image processing.

RADF 16 has a stack of original documents placed on its unillustrated original tray and automatically feeds the originals thus set, sheet by sheet, onto original table 15 in scanner unit 20. RADF 16, in order to enable scanner unit 20 to read one side or both sides of the original document in accordance with the operator's choice, comprises a sheet feed path for single-sided originals, a sheet feed path for double-sided originals, a feed path switching means, a group of sensors for monitoring and controlling the state of originals passing through different sites, and a controller. Since there conventionally have been many applications and many commercial models concerning RADF 16, no further explanation will be made.

Scanner unit 20 constituting scanner portion 11 for reading the image of the original placed on original table 15 comprises a lamp reflector assembly 21 for radiating the original surface with light, a first scan unit 20a having a first reflective mirror 22a reflecting the light reflected from the original to a photoelectric converting device (CCD 24), a second scan unit 20b having second and third reflective mirrors 22b and 22c for guiding the light reflected from the first reflective mirror 22a to CCD 24, an optical lens 23 for focusing the reflected light from the original passing through the above reflective mirrors, onto CCD 24 for converting the light into an electric image signal, a CCD 24 already mentioned for converting the reflected image from the original into an electric image signal.

Scanner portion 11 is configured to pick up original images by moving scanner unit 20 along the underside of original table 15 whilst successively placing the originals to be read, on original table 15 by the associated operation of RADF 16 and scanner unit 20. Specifically, the scan is controlled in such a manner that first scan unit 20a moves at a constant velocity V from the left to the right along the original table 15 while second scan unit 20b moves at half the rate of the velocity V, i.e., V/2, in parallel in the same direction. Thus, the image of the original placed on original table 15 is focused onto CCD 24 so that it successively reads the information of the original image line by line.

The image data thus obtained by reading the original image through scanner unit 20, is transferred to the image processor to be described later, where various types of processing are performed. Then, the data is temporarily stored in the memory of the image processor. The image data stored in the memory is loaded in accordance with the output instructions and transferred to a laser printer portion 12 where the image is produced on the sheet for recording. Laser printer portion 12 comprises a conveying system for conveying sheets as the recording material on which the image is formed, a laser writing unit 26 and an electrophotographic processing unit 28 for forming the image.

Laser writing unit 26, comprises a semiconductor laser beam source for emitting laser beams in accordance with the image data which has been captured in the memory by scanner unit 20 and is loaded therefrom, or in accordance with the image data transferred from an external apparatus, a polygonal mirror for deflecting the laser beam at an equi-angular velocity, and an f-θ lens for correcting the scanning laser beam deflected at an equi-angular velocity so that the laser beam having passed therethrough scans at a constant velocity the photoreceptor drum constituting electrophotographic process unit 28.

Electrophotographic processing unit 28, as is well known, includes a charger, developing unit, transfer device, separator, cleaning unit and charge erasing unit, all provided around the photoreceptor drum.

The sheet conveying system comprises: a sheet conveyer portion for conveying a sheet P to the aforementioned electrophotographic processing unit 28 for image forming, specifically, the transfer station where a transfer device is arranged; cassette feeders 31 and 32 for feeding a sheet P to the aforementioned sheet conveyer portion; a manual paper feeder 34 for feeding a sheet of a desired size as appropriate; fixing unit 29 for fixing the toner image or the image formed on sheet P after transfer; and a re-feeding path 33 for re-feeding sheet P in order to form another image on the rearside of sheet P with an image fixed on one side thereof.

Provided on the downstream side of fixing unit 29 is a post-processing unit 14 receiving the sheet P with an image recorded thereon and subjecting it to the designated process.

By the functions of laser writing unit 26 and electrophotographic processing portion 28, the image data loaded from the image memory is supplied to laser writing unit 28 where the laser beam is processed to thereby so as to scan the photoreceptor drum and hence form an electrostatic latent image on the surface of the photoreceptor drum in electrophotographic processing unit 28. Then, the latent image is visualized with toner, and the toner image is electrostatically transferred and fixed onto the surface of the sheet which has been fed from one of the paper feeders in the multi-paper feeder unit.

The paper with an image thus formed thereon is conveyed from fixing unit 29 via a discharging roller 37 into post-processing unit 14.

(Explanation of the circuits in the image processor)

Next, the configuration and function of the image processor for performing image processing of the original image information thus captured, in digital copier 10 will be described.

Figure 2:
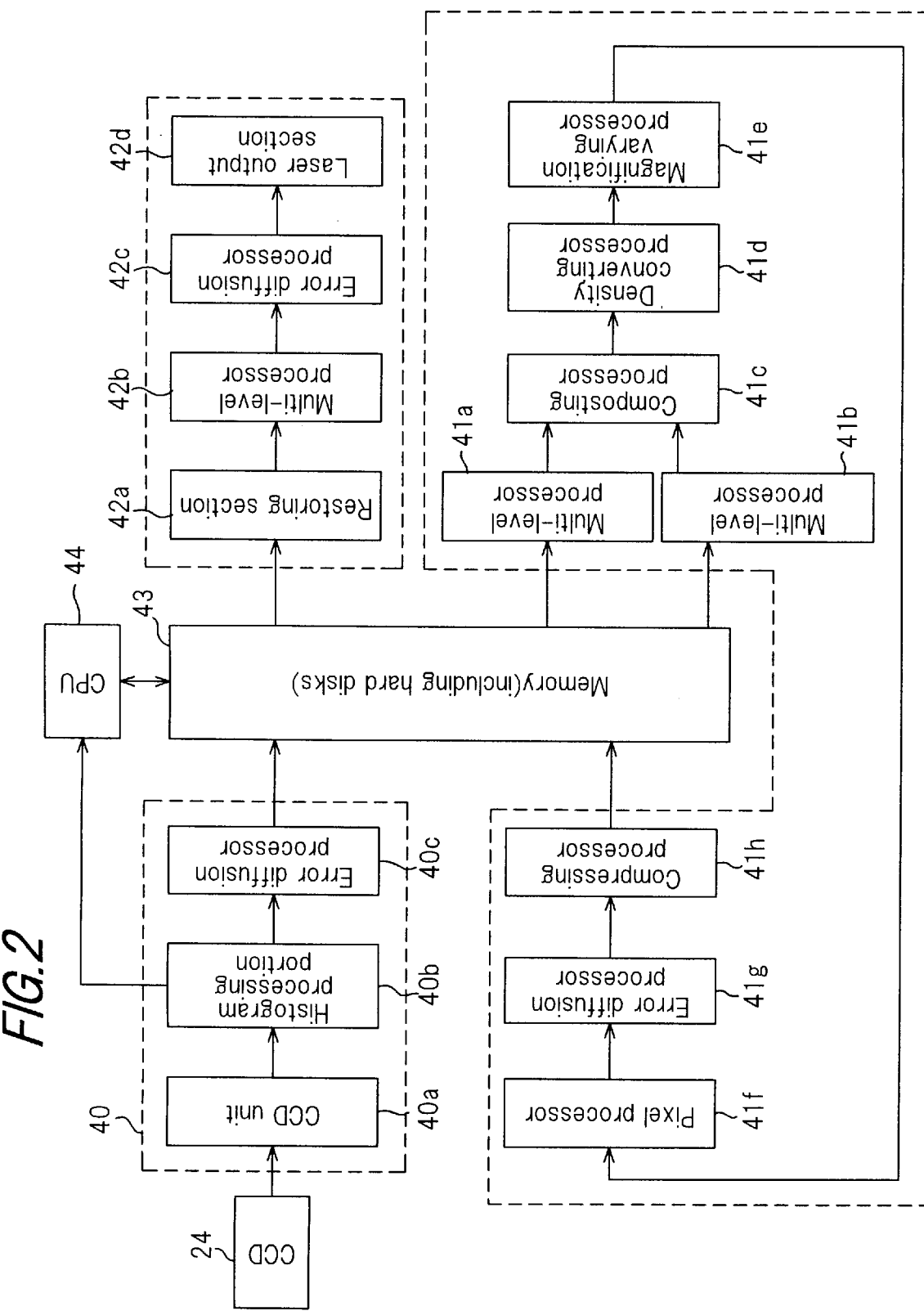
FIG. 2 is a block diagram showing the image processor contained in a digital copier.

FIG. 2 is a block diagram showing the image processor contained in digital copier 10 shown in FIG. 1. This image processor comprises: an image data input portion 40; an image processing portion 41; an image data output portion 42; a storage 43 made up of RAM (random access memory), hard disks etc.; and a central processing unit (CPU) 44.

Image data input portion 40 has a CCD unit 40a, a histogram processing portion 40b and an error diffusion processor 40c. Image data input portion 40 binarizes the image data of the original read through CCD 24, so as to produce a histogram of the digital binary data and processes the image data based on the error diffusion method and temporarily stores it into memory 43. More specifically, in CCD portion 40a, the analog electric signal corresponding to image densities in the image data is A/D converted and the converted data is subjected to the MTF correction, B/W correction or gamma correction so as to be output as a digital signal of 256 levels of gradations (8 bits) to histogram processing portion 40b.

In histogram processing portion 40b, the digital signal output from CCD portion 40a is analyzed for each level of density, made up of 256 levels of gradations, so as to produce density information (histogram data). The thus obtained histogram data is sent to CPU 44, as required, or sent to error diffusion processing portion 40c as pixel data.

Error diffusion processing portion 40c converts the digital signal of 8 bits per pixel output from CCD portion 40a into one bit (binary) based on the error diffusion method, one of pseudo intermediate processing, i.e., the method of using the binary error to determine binary values for neighboring pixels, so as to perform re-distributing computation for achieving exact and fine reproduction of local area density in the original.

Image processing portion 41 includes multi-level processors 41a and 41b, a composting processor 41c, a density converting processor 41d, a magnification varying processor 41e, a pixel processor 41f, an error diffusion processor 41g and a compressing processor 41h.

Image processing portion 41 is the processor which completes the conversion from the input image data into that desired by the operator. That is, the input data is processed through this processor until the completely converted output image data is stored into memory 43. It should be noted that the above processing sections contained in image processing portion 41 will operate as required and/or may not operate at all. Multi-level processors 41a and 41b revert the binary data which was binarized through error diffusion processor 40c, to 256 levels of data.

Composition processor 41c selectively performs logical operations for every pixel, i.e., logical sum, logical product or exclusive OR. The pixel data stored in memory 43 and the bit data from the pattern generator (PG) are the target of the logical operations. Density converting processor 41d sets up an arbitrary relationship between the input density and output density for the signal of 256 levels of data, based on the predetermined gradation converting table.

Magnification varying processor 41e performs interpolation of the known input data in accordance with the designated magnification ratio so as to determine the data (density values) of pixels for the associated pixels after magnification change. This magnification change is performed first, along the auxiliary scan direction and then along the main scan direction. Pixel processor 41f performs a variety of image processings to the input pixel data and also collects information on the data stream, such as extracting the features of the data. Error diffusion processor 41g performs a similar process to that implemented in error diffusion processor 40c of image data input portion 40. Compressing processor 41h compresses the binary data based on the run-length coding. For the compression of the image data, the compression starts to function after the final output image data is completed.

Image data output portion 42 includes: a restoring section 42a; a multi-level processor 42b; an error diffusion processor 42c; and a laser output section 42d. Image data output portion 42 restores the image data stored in memory 43 in compressed form, back to the original state, i.e., 256 tonal levels. This image data output portion performs error diffusion based on 4-levels of data which produces a gentler halftone representation than that of binary data and transfers the data to laser output section 42d.

Accordingly, restoring section 42a restores the image data which was compressed through compressing processor 41h, to the original state. Multi-level processor 42b performs a similar process to that implemented in multi-level processors 41a and 41b. Error diffusion processor 42c performs a similar process to that implemented in error diffusion processor 40c in image data input portion 40. Laser output section 42d, based on the control signal from an unillustrated sequence controller, converts digital pixel data into the on/off signal for the laser so as to activate or deactivate the semiconductor laser in laser writing unit 26, thus producing a static latent image on the photoreceptor drum.

The data handled in image data input portion 40 and image data output section 42 is basically stored in memory 43 in the form of binary data in order to save the capacity of memory 43. However, it is also possible to process the data in the form of 4-levels of data, taking into account the degradation of the image data.

(Explanation of the control configuration of the whole digital copier)

Figure 3:
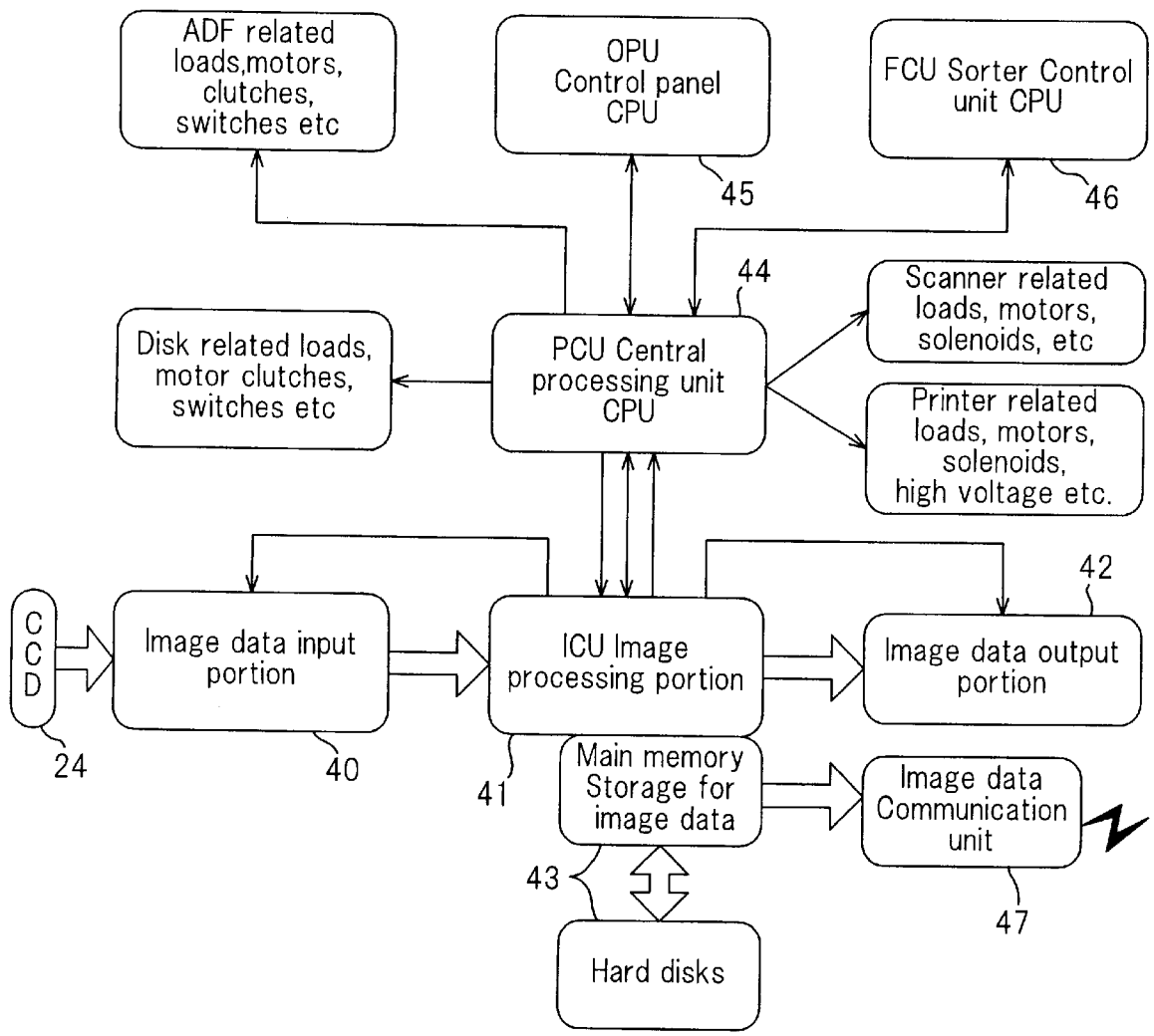
FIG. 3 is an overall block diagram of a digital copier.

FIG. 3 is a diagram showing a central processing unit (CPU) 44 controlling the operations of all the components of digital copier 10. Explanation concerning CCD 24, image data input portion 40, image processing portion 41, image data output portion 42, image memory 43 and central processing unit (CPU) 44 is contained in FIG. 2, is omitted to avoid repetition.

Central processing unit 44 controls drive components constituting digital copier 10, such as RADF 16, scanner portion 11 and laser printer portion 12, by sequence control and outputs control signals to each of them. Central processing unit 44 is connected with a control panel 45 in an inter-communicable manner so that control signals in accordance with the copy mode designated by the operator are transferred to central processing unit 44 to thereby operate digital copier 10 in accordance with the setup mode.

A control signal indicating the operating state of the digital copier is transferred from central processing unit 44 to control panel 45. Based on this signal, control panel 45 displays the operating state, i.e., in what state the copier is, to the operator, by means of the display portion, etc., Designated at 46 is a sorter control unit, which controls the operation of the post-processing unit which implements sorting of the copies output from digital copier 10 or other operations. Designated at 47 is an image data communicating unit for providing information exchange of image data, image control signals etc., with other digital image appliances.

Figure 4:
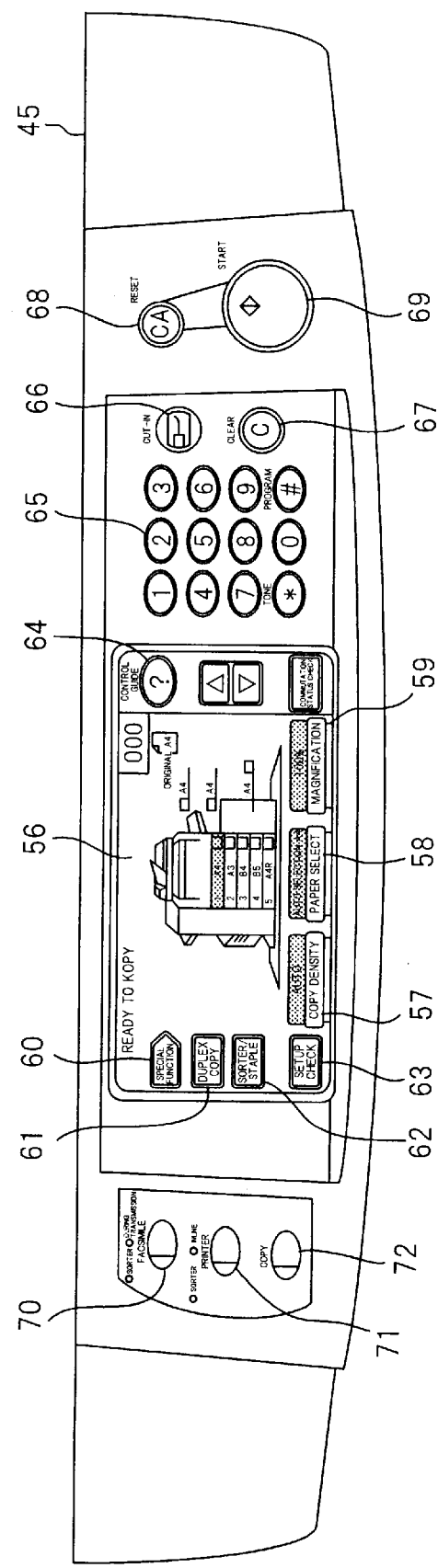
FIG. 4 is a plan view showing an example of the control panel in a digital copier.

FIG. 4 shows the control panel of digital copier 10.

Arranged in the center of this control panel is a touch panel type liquid crystal display device 56. This panel has a group of mode setup keys arranged on the periphery thereof. On the screen of touch-type LCD device 56, the basic start frame is constantly displayed to allow for mode selection. When an area representing a desired mode is directly pressed with the finger, the display on the LCD screen changes successively so that the user can select one of the modes. An editing function can be set up when the operator touches with their finger the area where the desired function is displayed.

The layout of the setting keys arranged on the control panel will be briefly described. First, more or less centered in LCD device 56 is an external outline of digital copier 10. Arranged below the external outline are a copy density setting key 57 for designating the copy density, a paper size setting key 58 for selecting the paper size and a magnification ratio setting key 59 for designating the copy magnification ratio.

Designated at 60 is a special function mode key for changing the liquid crystal display into the frame for setting the editing mode for editing the original image; 61 a duplex copy mode key for changing the liquid crystal display into a frame for setting up the duplex copy mode and selecting process mode details; 62 a key for changing the liquid crystal display into a command frame for output modes such as sorting, stapling etc.; 63 a setup checking key for checking the conditions of the current setup mode.

Further, 64 designates a control guide key for displaying the control method of the screen; 65 a number keypad for inputting numerical information such as the copy number etc.; 66 is a cut-in key for permitting a different copy mode to be cut into the currently processing copy mode; 67 a clear key for clearing the conditions set up through the numeric keypad etc.; 68 an reset key for canceling and reverting the setting state of the digital copier to the standard state; and 69 a start key for starting the operation in the mode setup through these keys. The three keys arranged on the left side on control panel 45 are mode selectors for facsimile mode 70, printer mode 71 and copy mode 72, from the top to the bottom, respectively.

The control panel and the keys arranged on the control panel presented here are just an example, and the arrangement of keys on the control panel will needless to say be different depending upon the functions installed to the digital copier.

(One embodiment of an input device having a touch panel)

Figure 5:
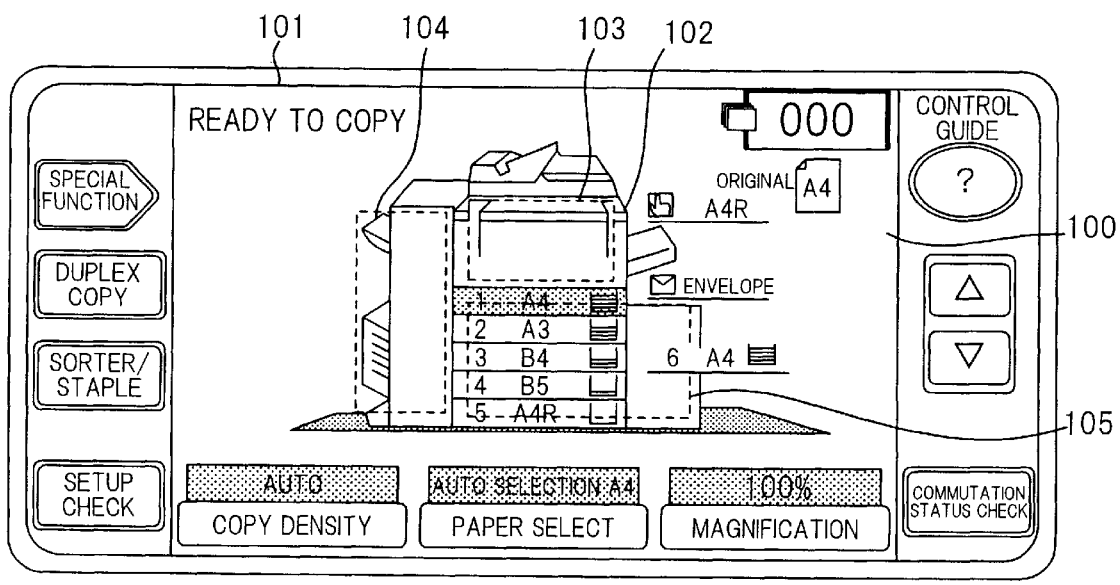
FIG. 5 is an enlarged view illustrating the LCD portion in the control panel shown in FIG. 4.

FIG. 5 is a detailed view of liquid crystal display device 56 of control panel 45 of digital copier 10 described with reference to FIG. 4.

LCD device 56 comprises a liquid crystal display portion 100 of a dot matrix type and a touch panel 101 laminated on the surface of the display. Touch panel 101 which is the means to detect the position at which the operator is touching the panel has an area greater than that of LCD portion 100. This touch panel may also be configured to cover a multiple number of key groups printed at the peripheral area of LCD portion 100 so as to allow the printed keys to be operated as well as the keys displayed on LCD portion 100.

In more or less the center of LCD portion 100 thus configured, an overall external outline 102 of digital copier 10 having control panel 45 is displayed. Briefly explaining overall external outline 102, an outline 103 of the copier for performing image forming is displayed in the upper central portion of overall external outline 102; and an outline 104 of the post-processing unit for handling sheets such as stapling the sheets output from digital copier 10 is displayed on the left part of overall external outline 102. Displayed on the right and lower central parts of overall external outline 102 is an outline 105 of the paper feeder unit for supplying sheets of paper to digital copier 10.

Now, description will be made of the transitional steps of the display when touch panel 101 is operated viewing the frame displayed on LCD portion 100.

Figure 6:
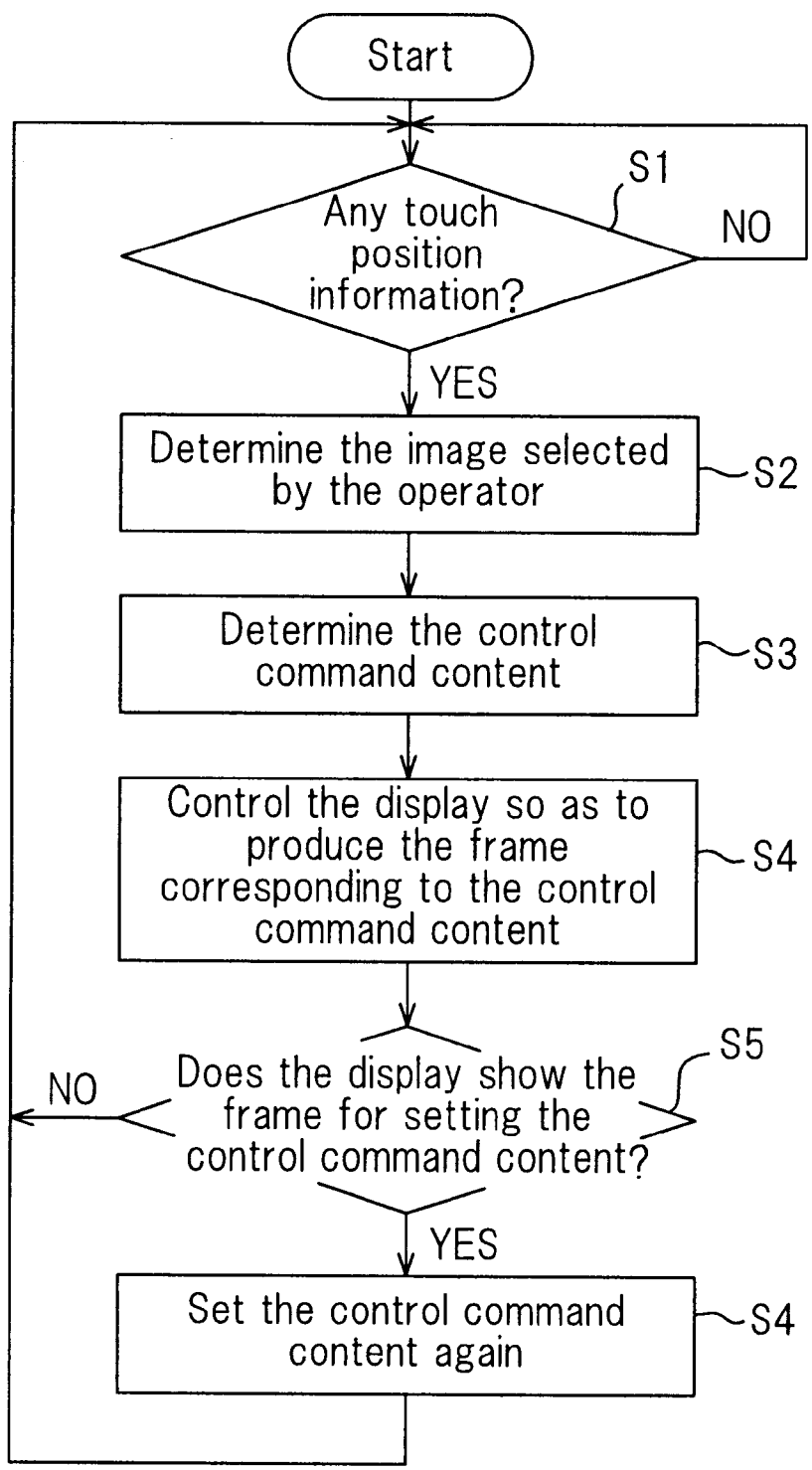
FIG. 6 is a flowchart illustrating the operation flow of the CPU for performing the display in the LCD portion.

FIG. 6 is a flowchart showing the outline of the operation of CPU 44 to implement the display of LCD portion 100.

When the operator touches a figure displayed on LCD portion 100, touch panel 101 locates the position where the operator touched and outputs the positional information to CPU 44. Receiving this positional information (Step S1), CPU 44 determines the figure at which the operator touched (Step S2) to thereby distinguish the content of the operation associated with the figure (Step S3). Then, the CPU performs control so as to display the frame in accordance with the selection, on LCD portion 100 (Step S4). When the frame for allowing the operator to set the detail of the selected operation appears (Step S5), the conditions of the operation are set up again, following the selection of the operator.

Next, description will be made of the illustrative display input operation.

Figure 7A:
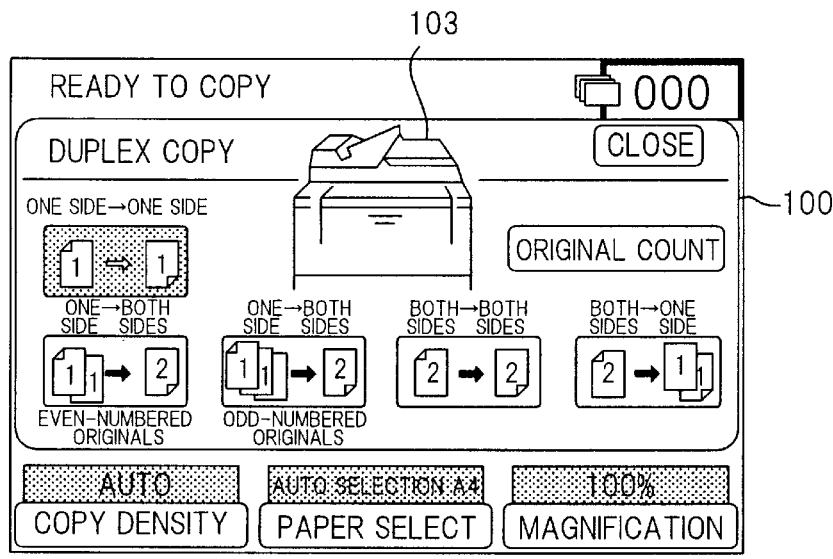
FIGS. 7A to 7C are diagrams showing the changes in the frame contents when the external outline in the LCD portion is operated.
Figure 7B:
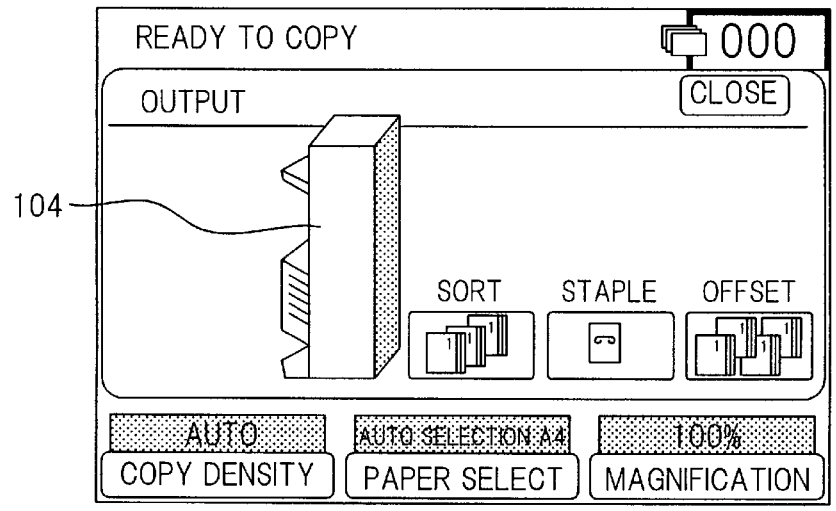
Figure 7C:
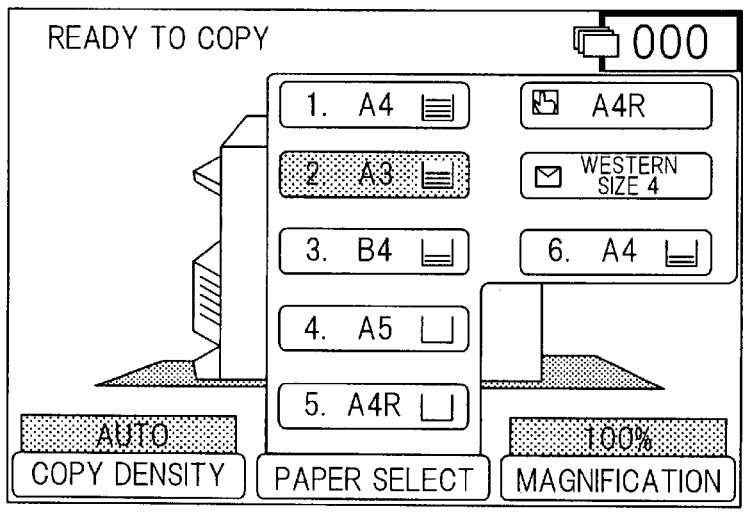

For example, when one of partial outlines 103, 104 and 105 of overall external outline 102 is touched, CPU 44 changes the display into the frame for mode setting of digital copier 10, in accordance with the outline which was touched. FIGS. 7A to 7C are diagrams showing the changes of the display when one of the three outlines on the display portion is selected. When copier body outline 103 is touched, a frame for setting the duplex copy mode appears (FIG. 7A). When post-processing unit outline 104 is touched, a frame for setting the output mode appears (FIG. 7B). When paper feeder unit outline 105 is touched, a frame for setting the paper size selection appears (FIG. 7C).

Now, the frame display in each mode made by CPU 44 will be detailed.

(Duplex copy mode)

When, for example, copier body outline 103 in overall external outline 102 of digital copier 10 is operated, the view changes to be the frame for setting the duplex copy mode shown in FIG. 7A. It should be noted that this frame for setting the duplex copy mode can be displayed when the duplex copy key printed on the left side of the LCD portion 100 is operated.

Figure 8A:
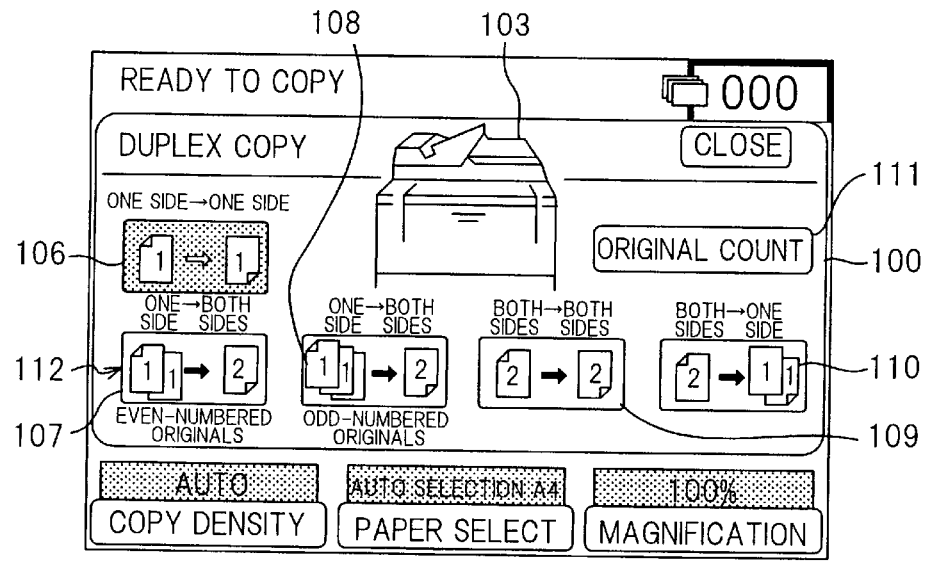
FIGS. 8A to 8C are diagrams showing the changes for setting the duplex copy mode.
Figure 8B:
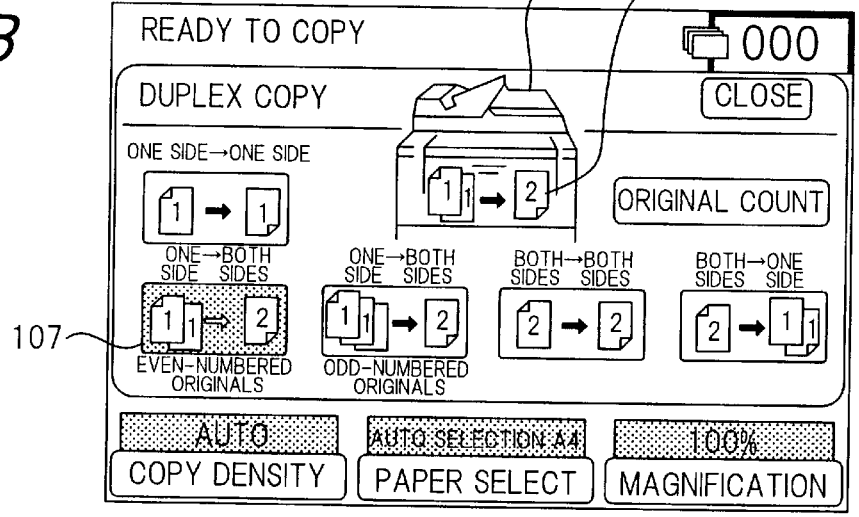
Figure 8C:
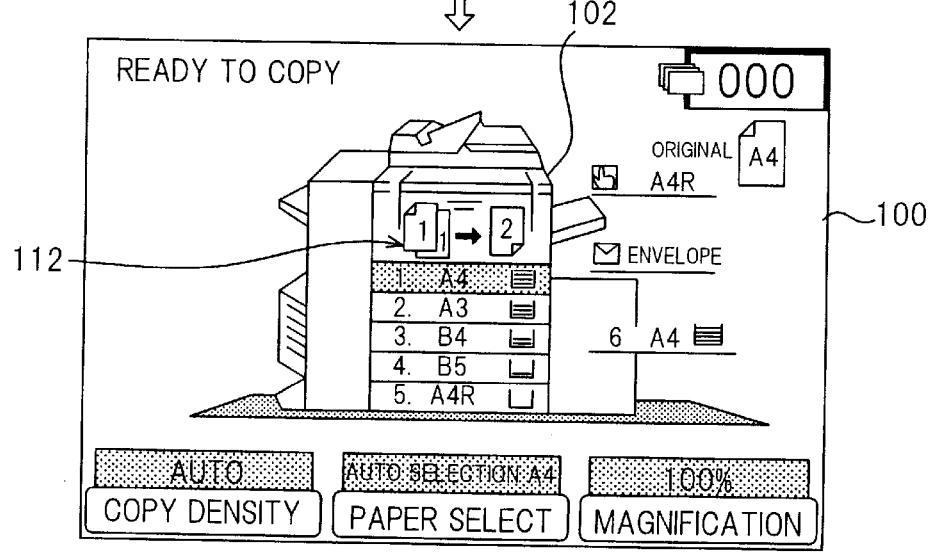

Referring now to FIGS. 8A to 8C, the transitional steps of the display in LCD portion 100 will be described sequentially.

In FIGS. 8A to 8C, the sequence of the transitional steps from the frame for setting duplex copy mode shown in FIG. 7A will be explained.

As shown in FIG. 8A (the same frame as that in FIG. 7A), more or less the center of LCD portion 100 in the frame for setting the duplex copy mode, which is the selected part, i.e., copier body outline 103 of overall external outline 102 of digital copier 10, alone, remains and setting keys relating to duplex copy mode replaces the other areas. More specifically, paper feeder outline 104 and post-processing unit outline 105 disappear, the setting keys are displayed in the first display area near the copier body outline 103.

In the above description, copier body outline 103 is displayed in more or less the center of LCD portion 100, remaining in its original position while the keys for setting the detail of the mode are displayed in the first display area or around copier body outline 103. However, arrangement is not limited to this, but copier body outline 103 may be shifted to some extent and the keys for setting the detail of the mode may be displayed in the remaining display area. Nevertheless, it is preferred that the displayed position of copier body outline 103 should not be displaced excessively and is kept in the same form in order to avoid the operator's confusion as much as possible.

Here, the keys displayed in the first display area will be briefly explained. The key arranged on the left of copier body outline 103 is a key 106 for designating the mode in which a one-sided original is duplicated to produce a one-sided copy, i.e., the typical mode before the duplex copy mode is selected. Arranged below copier body outline 103 are: from the left, a key 107 for setting the mode in which an even number of one-sided originals are duplicated to produce two-sided copies; a key 108 for setting the mode in which an odd number of one-side originals are duplicated to produce two-sided copies; a key 109 for setting the mode in which two-sided originals are duplicated into two-sided copies; and a key for setting the mode in which two-sided originals are duplicated to produce one-sided copies. Each key has an icon indicating the condition designated thereby.

When one-side originals are processed, there are cases where it is unknown whether the originals are in even number or in odd number. In this case, an original count key 111 arranged on the right of copier body outline 103 is provided in order to designate counting of the number of the originals stacked on the automatic document feeder.

When one of the duplex copy modes is selected from these keys (except one-side→one-side mode key 106 and original count key 111), the figure representing the selected mode is displayed as an icon 112 laid over copier body outline 103 of digital copier 10 (FIG. 8B). This area, i.e., the area within the external outline is assumed to be the second display area. The figure (112) on the key (107) for setting the detailed conditions of the selected mode is adapted to be displayed as icon 112 within the second display area, so this configuration provides for measures against operator confusion.

In the above description, when a desired mode condition is selected from the setting keys displayed in the first display area (the area around copier body outline 103 displayed on LCD portion 100), icon 112 representing the set mode is displayed in the second display area (in copier body outline 103). However, icon 112 associated with the set mode may also be adapted to be laid over the second display area not only when touch panel 101, laminated over LCD portion 100, is engaged but also when the keys arranged on the control panel in areas other than touch panel 101 are operated. When the mode selection relating to duplex copy has been completed, the display reverts back to overall outline 102 of digital copier 10 while copier body outline 103 and icon 112, relating to the selected mode currently displayed on LCD portion 100, continue to be displayed (FIG. 8C).

In this way, icons are displayed in the first display area near external outline 102 of digital copier 10, displayed on LCD portion 100, or the icon of the selected mode is displayed, laid over external outline 102 in the second display area, so that it is possible for the operator to visually recognize the part being selected and the operation being implemented. Thus, the operating environment of the copying system can be easily known when some modes have been set up in combination.

Although the above description mentioned that when the display reverts back to overall external outline 102 of digital copier 10 with icon 112, overall external outline 102 of digital copier 10 only may be reverted to the display with no icon, in certain selected modes. In the most preferable embodiment, when overall external outline 102 of digital copier 10 is displayed after completion of mode setting relating to duplex copy, copier body outline 103 which has been already displayed remains as it is, the other parts which have been hidden, i.e., outlines 104 and 105 are displayed again so that overall external outline 102 of digital copier 10 is re-displayed essentially in the same position. However, the displayed position may be displaced to some acceptable extent.

(Output mode)

Next, when post-processing unit outline 104 which is displayed on the left side in overall external outline 102 is designated, the display changes into the frame shown in FIG. 7B, presenting the frame for setting the output mode. It should be noted that this frame for setting the output mode can be changed when the sorter/staple key located on the left side at the peripheral area of the LCD portion 100 is operated.

Referring now to FIGS. 9A to 9D, the transitional steps of the display in LCD portion 100 will be described sequentially.

In FIGS. 9A to 9D, the sequence of the transitional steps from the frame for setting the output mode shown in FIG. 7B will be explained.

As shown in FIG. 9A (the same frame as that in FIG. 7B), more or less the left part of LCD portion 100 in the frame for setting the output mode which is the selected part, i.e., post-processing unit outline 104 alone, remains and setting keys relating to the output mode replace the other area. In the above description, the post-processing unit outline 104 is displayed in more or less the left part of LCD portion 100, remaining its original position and displayed state while the keys for setting the detail of the mode are displayed in the first display area (the display area around post-processing unit outline 104) or on the right side of post-processing unit outline 104. However, arrangement is not limited to this. Post-processing unit outline 104 may be shifted to some extent and the keys for setting the detail of the mode may be displayed in the remaining display area. Nevertheless, it is preferred that the displayed position of the post-processing unit outline 104 should not be displaced excessively and is kept in the same form in order to avoid operator confusion as much as possible.

Now, the keys displayed in the remaining area will be briefly explained. The keys arranged on the right side of post-processing unit outline 104 are: a key 113 for sort mode in which the sheets output from digital copier 10 are sequentially sorted; a key for staple mode in which a multiple number of output sheets are stapled; and a key 115 for offset mode in which groups of output sheets from digital copier 10 are placed offset in a staggered manner for each other for each group of the originals. These keys contain icons 116, 117 and 118 respectively.

When a desired output mode is selected from the above setting keys, the figure of the selected output mode, i.e., icon 116, 117 or 118 is displayed in an overlapping manner in the second display area i.e., post-processing unit outline 104 (see FIG. 9B and FIG. 9C). These FIGS. 116, 117 and 118 are adapted to be identical to icons displayed on the mode setting keys, so as to avoid user confusion.

The above description mentioned that when a desired mode content is selected from the setting keys displayed on the right side of post-processing unit outline 104, icon 116, 117 or 118 representing the set mode is displayed in the second display area. However, icon 116, 117 or 118 associated with the set mode may also be adapted to be laid over within post-processing unit outline 104 displayed on LCD portion 100 not only when touch panel 101, laminated over LCD portion 100, is engaged but also when the keys arranged on the control panel in areas other than touch panel 101 are operated.

Further, when icons 116, 117 and 118 are displayed in the second display area, these icons 116, 117 and 118 may be displayed at the position in post-processing unit outline 104, corresponding to the real position in the unit where the operation of the mode designated is performed or where the resulting matter is obtained after the operation of the mode. In this way, it is possible for the operator to correctly know the mode being implemented and the place where the resulting matter is obtained.

Figure 10:
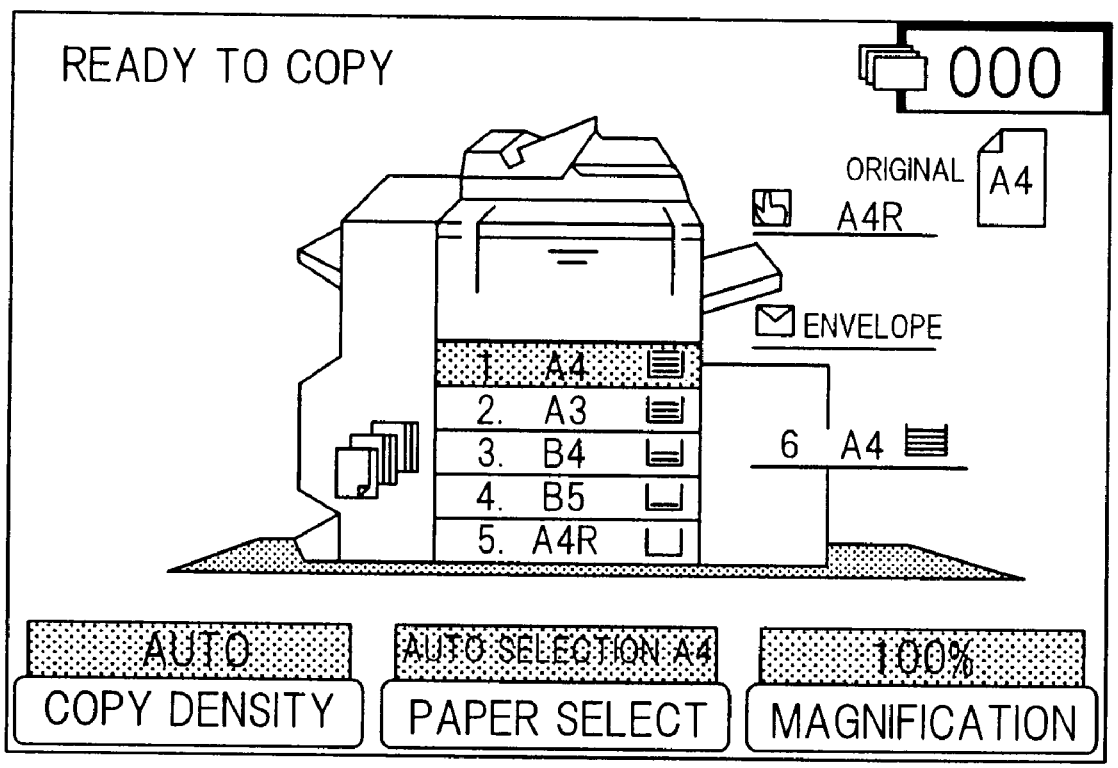
FIG. 10 is an illustrative view of the frame of the overall external outline of the digital copier, restored after setting of the output mode.

Further, when a multiple number of modes, in the unit corresponding to post-processing unit outline 104, or when, for example, the sort mode shown in FIG. 9B and the staple mode shown in FIG. 9C are set up at the same time, the plurality of modes can be displayed with an icon 119 as shown in FIG. 9D so that the icon is laid over in an appropriate position of post-processing unit outline 104. When the setting associated with the output mode has been completed, the display reverts back to overall outline 102 of digital copier 10 while post-processing unit outline 104 and icon 116, 117 and/or 118 relating to the selected mode displayed on LCD portion 100 before reversion, continue to be displayed (FIG. 10).

Although the above description mentioned that when the display reverts back to overall external outline 102 of digital copier 10 with icon 116, 117 and/or 118, overall external outline 102 of digital copier 10 only may be reverted to the display with no icon, in certain selected modes.

Figure 11A:
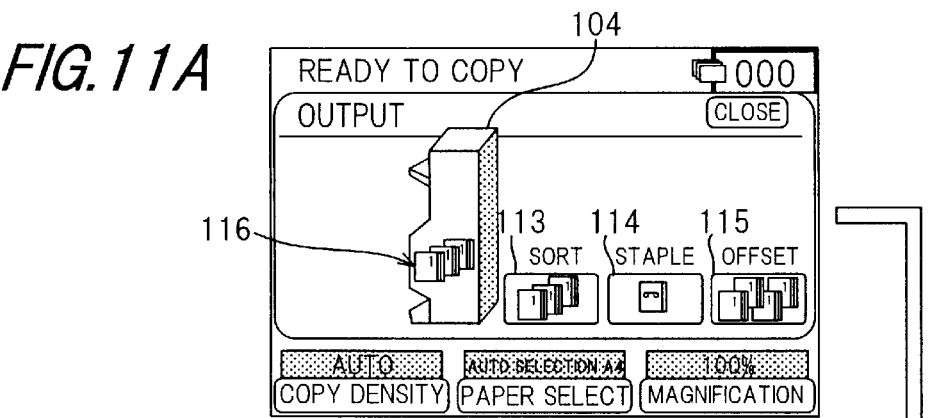
FIGS. 11A to 11D are diagrams of transitional steps for showing the setup of another output mode.
Figure 11B:
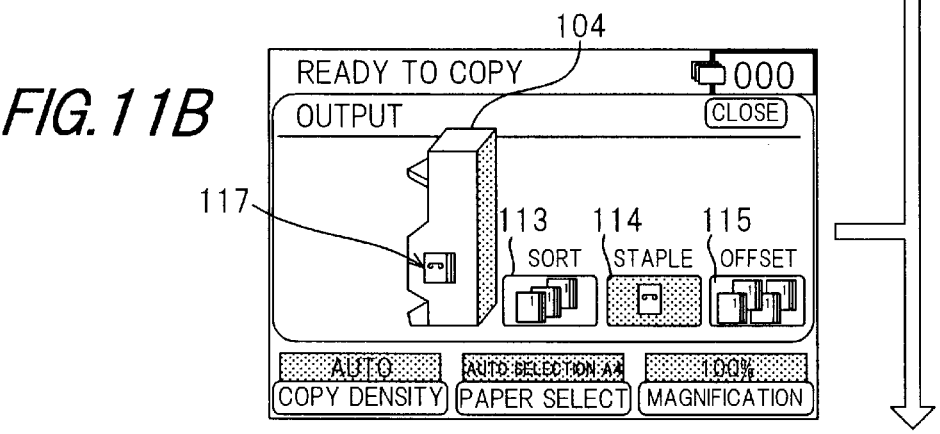
Figure 11C:
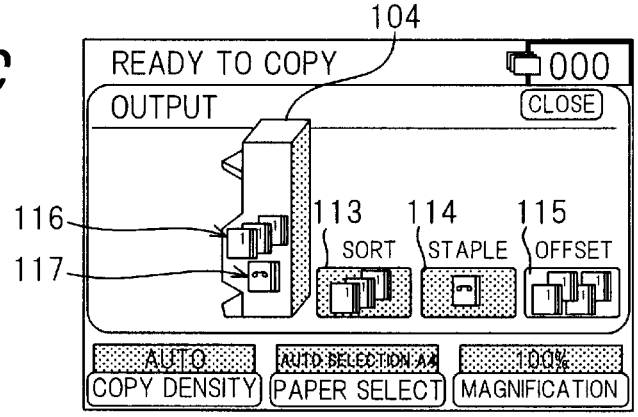
Figure 11D:
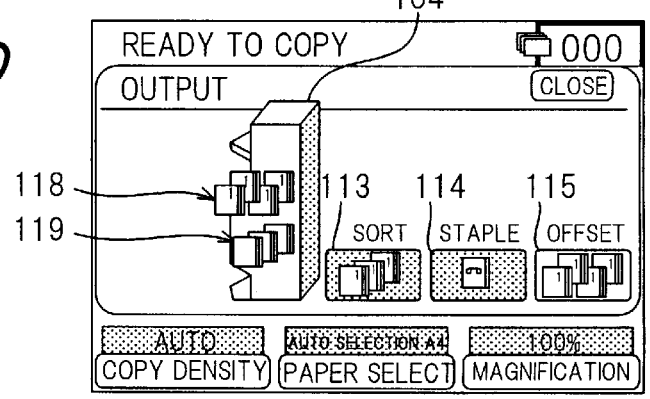

Further, as shown in FIGS. 11A to 11D, when plural icons 116, 117 and/or 118 are displayed laid over post-processing unit outline 104 for displaying the setup of plural modes, instead of displaying icons 116, 117 and 118 separately within post-processing unit outline 104, it is also possible, as already mentioned, to represent the setup state of the plural modes with an integrated icon involving icons 116, 117 and 118, which all are related to one another. Illustratively, consider a case where the sort, staple and offset modes are selected together. In this case, when the sort and staple modes are selected first, icon 116 representing the sort mode and icon 117 representing the staple mode are displayed positioned appropriately over post-processing unit outline 104 (FIG. 11C). Then when the offset mode is set up, icon 118 for the offset mode is displayed appropriately laid over post-processing unit outline 104. At this moment, icon 116 representing the sort mode and icon 117 representing the staple mode are replaced with a single icon 119. That is, among the plural icons, icons 116 and 117 related to each other are replaced with a combined icon 119 so that the combined icon and the remaining icon 118 will be displayed at appropriate positions, laid over post-processing unit outline 104.

In this way, two separated display areas, i.e., the first display area which is formed near overall external outline 102 and the second display area which is formed laid over overall external outline 102, are provided, and for each a group of icons associated with one another are displayed. This configuration allows the operator to view the combination of icons displayed and hence easily recognize in what mode the copy is to be performed and in what form the output materials will be obtained.

(Paper selection mode)

Next, when paper feeder outline 105 which is displayed on the left and bottom parts of external outline 102 of digital copier 10 is selected, the view changes to the frame for setting the selection of the paper feeder devices shown in FIG. 7C, or more specifically, selecting a paper receptacle having a desired size of paper from a multiple number of paper receptacles in the paper feeder unit. It should be noted that the view can also be changed into this frame for selecting a desired size of paper in the paper feeder unit when the paper selection key displayed in the bottom center of LCD portion 100 is operated.

Figure 12A:
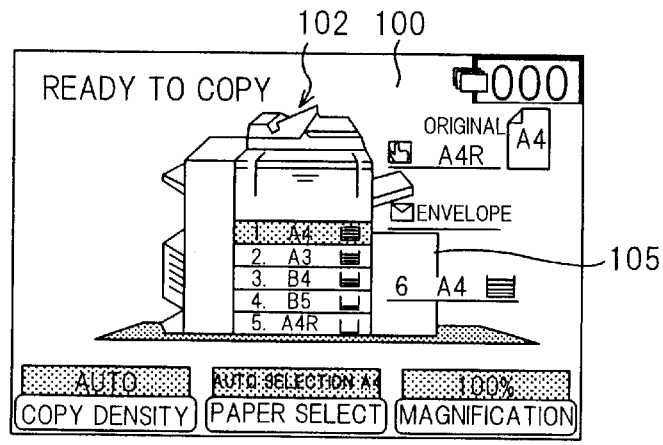
FIGS. 12A to 12C are diagrams showing the transitional steps during sheet setup.
Figure 12B:
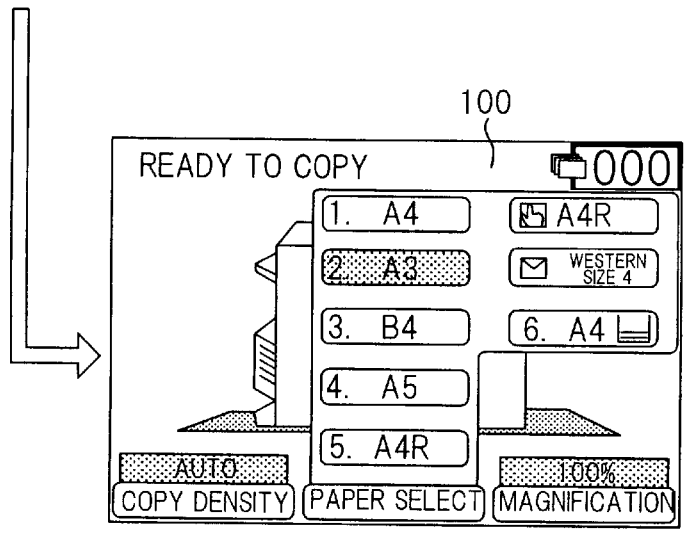
Figure 12C:
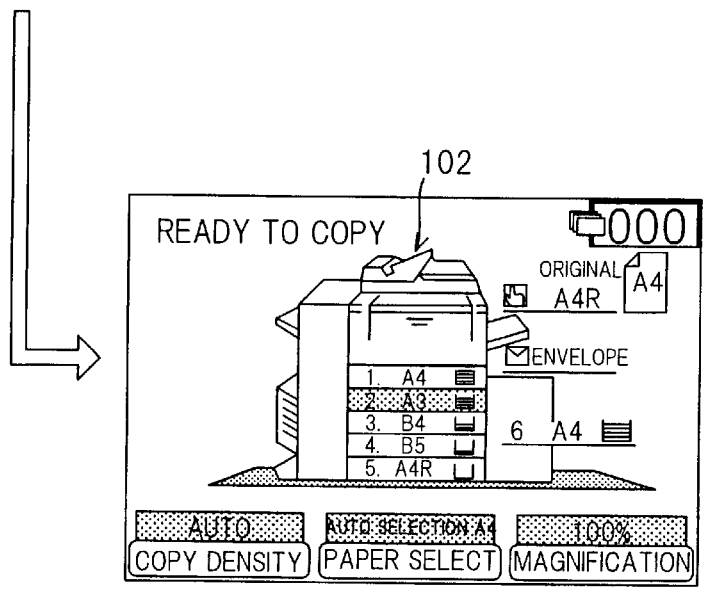

Referring next to FIGS. 12A to 12C, the sequence of transitional steps of the display of LCD portion 100 will be explained.

When the LCD screen (FIG. 12A) on control panel 45 which is in the ready state is operated as above, the view changes to the frame for setting the paper selection mode (FIG. 12B), in which paper selection keys are displayed in a layout simulating the paper feeder devices in the paper feeding unit of digital copier 10.

When the key of a desired paper size (for example A3) is selected from the selection keys on the display, the view changes to the frame shown in FIG. 12C, in which the icon of the selected paper feeder of, for example, A3 sized paper is reversed so as to inform the fact that the paper can be fed.

In this paper selection mode, as clearly seen from FIGS. 12A to 12C, overall external outline 102 of digital copier 10 is displayed in more or less the center of LCD portion 100. That is, it is basically displayed in the same position and in the same form in LCD display portion 100, though part of it is hidden temporarily by the layout of the paper feeder selecting keys as shown in FIG. 12B and then reappears in the same position.

When icons relating to the setup mode are displayed, CPU 44 determines how or in which area each icon is displayed relative to external outline 105 displayed on LCD portion 100, in accordance with the meaning (the setup mode condition) of the icon. The icons relating to the handling of the paper on which the image is recorded, are displayed directly laid over the area (the second display area) within the outline of the unit for handling the paper. The icons relating to the handling of the input image are displayed in the vicinity of external outline 105 (the first display area). This configuration allows the operator to easily recognize in which mode of operation each of the devices constituting digital copier 10 is set up.

(Explanation about a variety of image editing functions)

Figure 13:
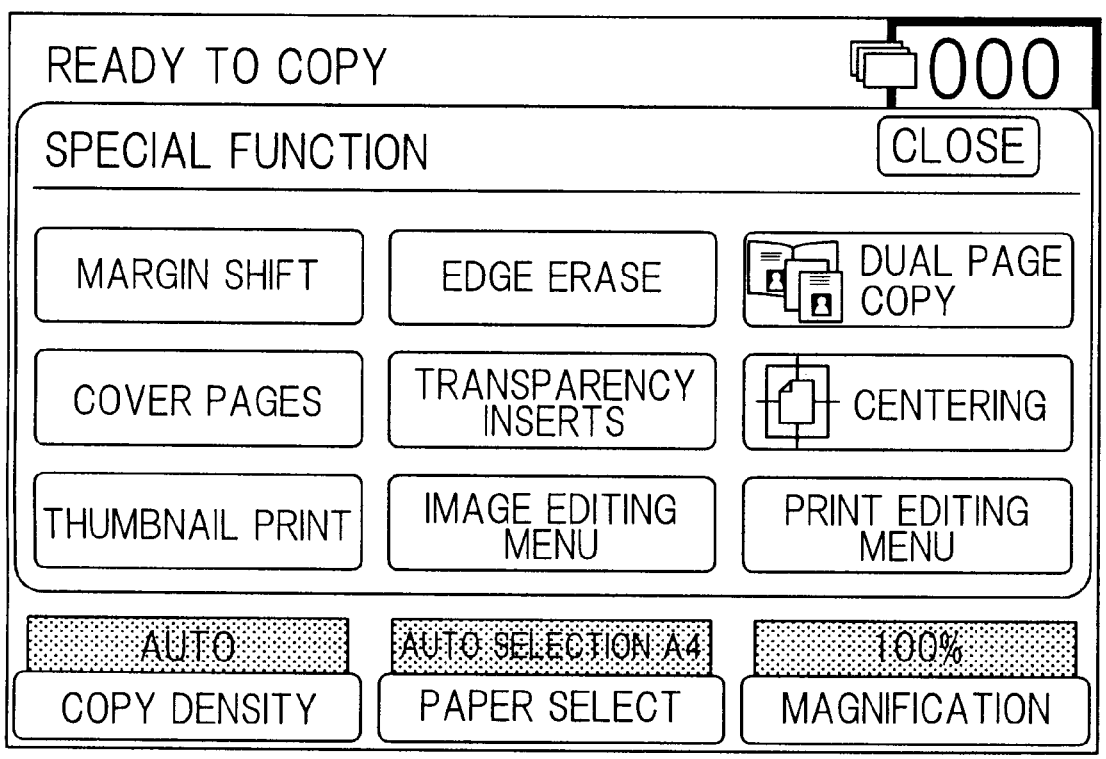
FIG. 13 is an illustrative view showing the frame for selection of special functions.

Digital copier 10 of the present invention has a variety of image editing functions, which provides conversion of the captured original image information into various forms. For the operator to choose a desired function from such a variety of image editing functions, a special function mode key 60 is provided on control panel 45 shown in FIG. 4. When key 60 is operated, a number of editing functions are displayed in menu form so as to provide the frame (FIG. 13) which allows the operator to select one of the editing functions.

Now, each function displayed in this case will be briefly explained.

'Margin shift' is the function for allowing the paper to have blank space required for binding. Taking into consideration sheets with printing on both sides, the margin can be adjusted from 0 to 20 mm, in mm.

'Erasing edge shadows' is the function for automatically erasing the black shadows formed at the periphery of the paper when a book original is copied with the original cover open. The setting of this function can be adjusted from 0 to 20 mm, in mm.

'Dual page copy' is the function of scanning the spread of a book original to read the whole original face and produce two pages of copies with a single copy start command.

'Cover page insertion' is the function of designating whether cover pages are inserted at the beginning and end of the copies of the original documents.

'Inserts between transparencies' is the function of controlling the provision of the insert paper between transparencies when copying is performed on transparencies, so that the transparencies will not be attracted to each other when they are stacked on the paper output tray.

'Centering' is the mode in which the original image is recorded in the center of the paper. For example, when a B5 sized original document needs to be recorded on a A4 sized sheet, the image of B5 size is adjusted to be positioned in the center of the A4 sized sheet.

'Thumbnail' is the mode in which a multiple number of original images are reduced in size and recorded on a sheet of paper. In this mode, the reduction ratio is determined based on the sheet size of the copy, the size of documents and the number of the documents, and the reduced images are complied to be output altogether in a sheet of paper.

'Print editing menu' produces the frame for adding extra information such as date, page number, number, stamp (urgent, important, circulation etc.) and the like, at designated positions on the sheet with an original image recorded thereon. 'Image editing menu' is the display switching key for displaying editing function selecting keys which are not displayed on the basic frame of editing function keys.

Next, using some practical examples of editing functions, description will be made of the way of mode setting when these editing functions are used to perform editing and recording of image originals and the way of displaying icons which inform the operator of the mode being set up. It should be noted that the display frame contents, transitional steps of the display, the way of setting a mode while viewing the display frame, and the like are mere examples, meaning that the display contents can be modified in parts and as appropriate.

As an example of the editing operations, let us consider a copying mode in which the 'dual page copy mode' and the 'edge shadow erasing mode' are combined. In this case, the spread of a book original is placed facedown over the original contact glass and the image of two pages of the book original is produced on two separate sheets of paper while unwanted shadows on the image of each sheet are erased. This case will be explained following the transitional steps of the display shown FIGS. 14A to 16E.

Figure 14A:
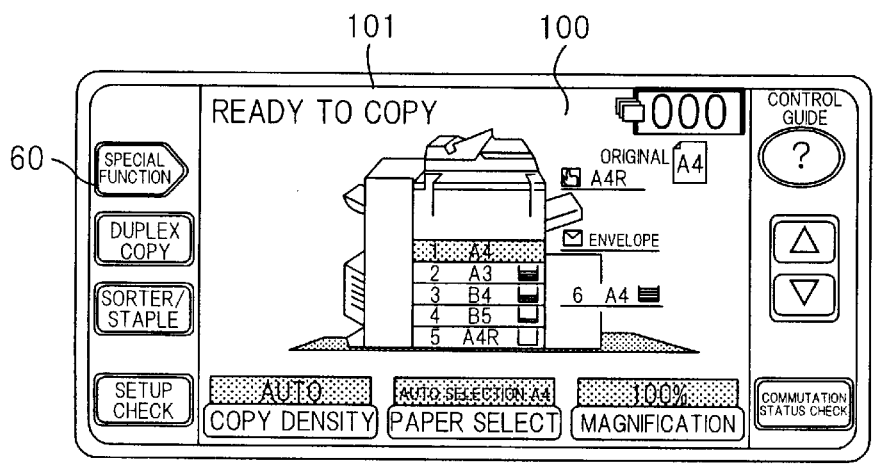
FIGS. 14A to 14C are diagrams showing the display changes when the edge erasing function is selected.
Figure 14B:
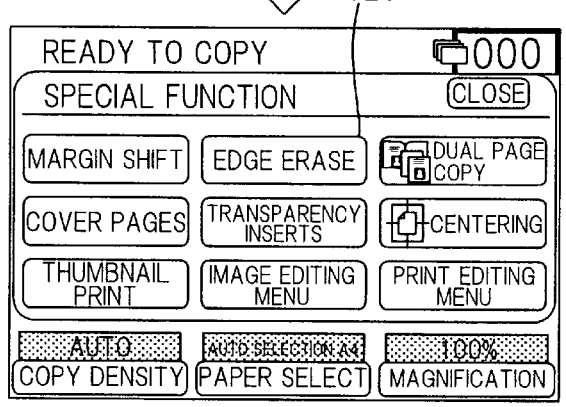
Figure 14C:
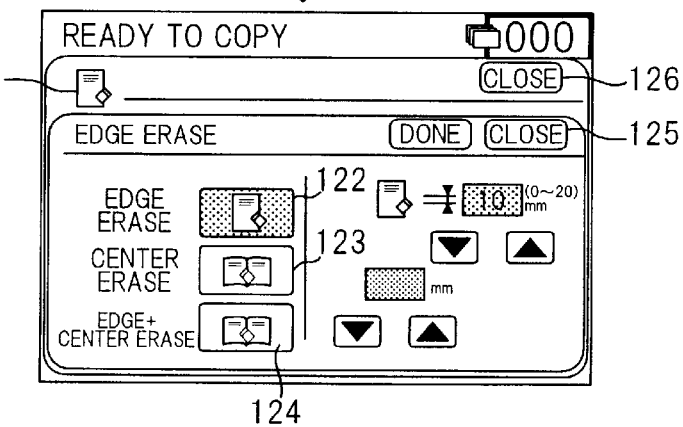

First, explanation will be made referring to FIGS. 14A through 14C. With LCD portion 100 provided for control panel 45, displayed with a basic frame shown in FIGS. 14A, special function key 60 arranged on the left side of LCD portion 100 is operated. Then, the display of LCD portion 100 changes to the special functional selection frame shown in FIG. 14B. Next, among a multiple number of selectable functions, edge shadow erasing function key 120 is operated so as to select the edge shadow erasing mode. At this moment, although not illustrated, edge shadow erasing function key 120 is temporarily reversed and then the display changes to the frame as shown in FIG. 14C, the one for setting the detail of the edge shadow erasing function.

In this case, when the operator temporarily presses the touch panel in the place where edge shadow erasing key 120 is displayed, the key is reversed so that the operator can visually know the edge shadow erasing mode has been selected. It is further effective if an electronic sound etc. is used when the display is reversed.

When shadow erasing key 120 is operated, a special icon 121 indicating the activation of the edge shadow erasing function is displayed at the same time in the predetermined area in the upper left part of the display screen of LCD portion 100. This icon is displayed synchronously with the touch of edge shadow erasing key 120 so that the operator can know the selected icon is of the edge shadow erasing mode. In this way, this configuration allows for easy understanding of what the icon indicates when the icon is contained in the display frame for selection or when the display has changed to another display frame.

Additionally, the edge shadow erasing mode currently selected includes an edge shadow erasing function of automatically erasing the shadows at the peripheral part having a designated area width, a center shadow erasing function of automatically erasing the shadow which is formed around the book seam when a book original is copied, and an edge and center shadow erasing function in which the above two shadow erasing functions are combined. In this embodiment, it is assumed that the edge shadow erasing mode is selected as standard when edge shadow erasing key 120 is touched (an edge shadow erasing key 122 is reversed). It is also possible to set up so that center erasing mode 123 or edge plus center shadow erasing mode 124 is set up at the beginning.

When key 123 or 124 in the detail setup frame shown in FIG. 14C, is pressed, the mode can be changed. Input keys for designating the erasing area in mm in order to automatically erase the edge image (shadow) formed at the periphery of the sheet are provided for each function on the right side of the display frame. That is, the up and down keys which are not allotted with reference numerals, are pressed so that the edge shadow erasing area can be adjusted in mm within the range of 0 to 20 mm. FIGS. 15C, 15C1 and 15C2 show the changes of the frames for setting up the detail when instead of pressing the edge shadow erasing key, center erasing key 123 or edge+center shadow erasing key 124 is pressed respectively (FIGS. 15C1 and 15C2).

In the above detail setup frame shown in FIG. 15C, after the detail of the edge shadow erasing mode is set up, a key 125 which is disposed in the upper right area on the display screen and indicates the change of the frame is operated. Then the display changes into the frame for selecting special functions shown in FIG. 16D (of FIGS. 16C to 16E). At this moment, since the edge shadow erasing mode is selected, edge shadow erasing key 120 is reversed in order to inform the operator of this condition.

Figure 16E:
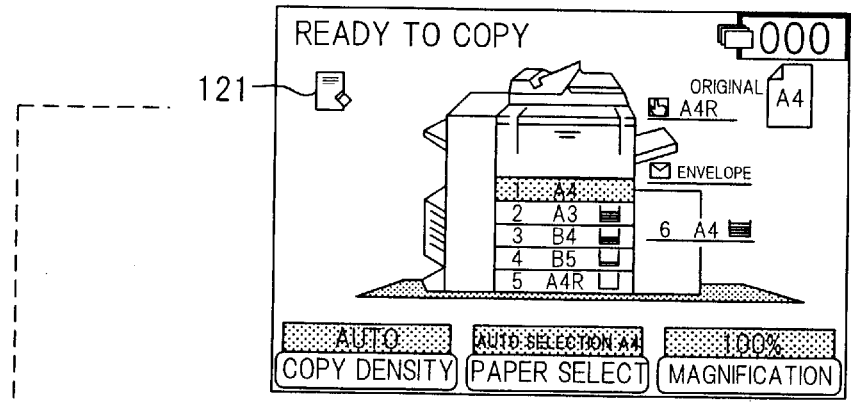
FIGS. 16C to 16E are diagrams showing the frame transitional steps following the process shown in FIG. 14C when the edge erasing function is selected.
Figure 16D:
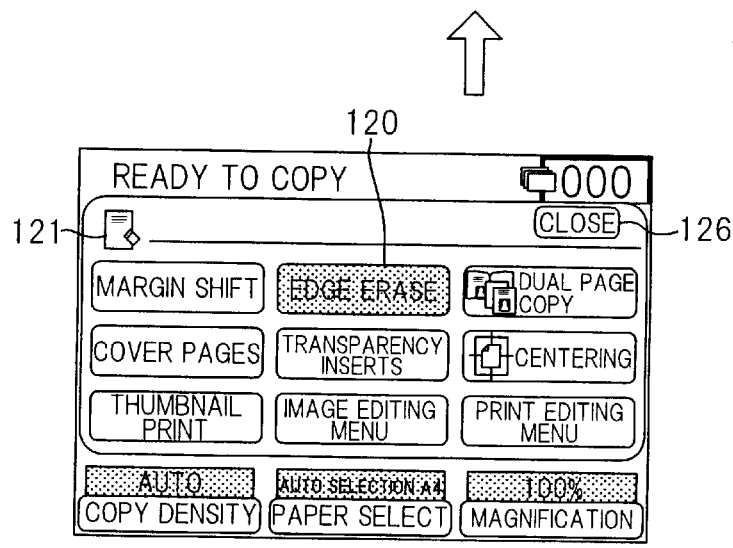
Figure 16C:
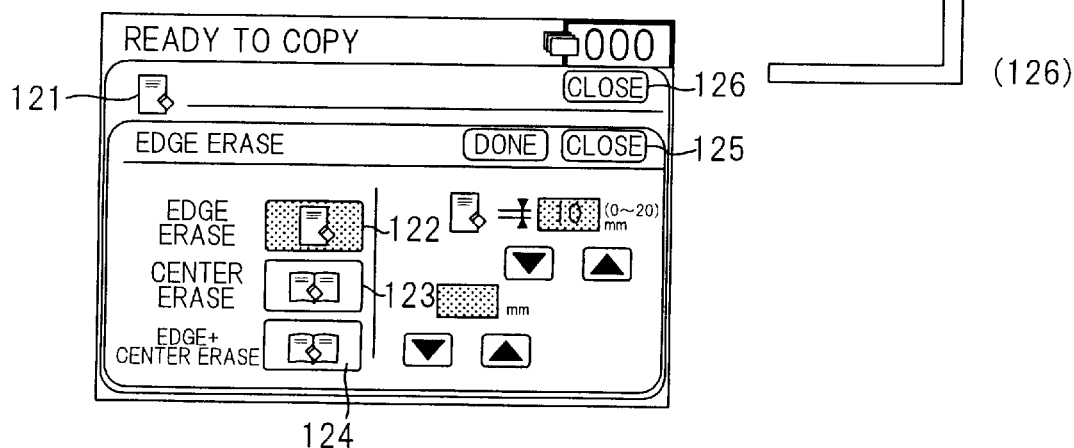

In the detail setup frame shown in FIG. 16C, icon 121 is the one which is dedicatedly displayed in order to inform the user of the activation of the edge shadow erasing mode. This icon 121 is adapted to be basically unchanged in its display state and position on the display screen even when the display changes from the detail setup frame of FIG. 16C to the special function selecting frame of FIG. 16D. And when no further selection of desired special functions in the special function selecting frame of FIG. 16D are needed, the frame is closed by pressing key 126 to change so that display returns to the basic frame of FIG. 16E of FIG. 16C to 16E.

In this basic frame of FIG. 16E, the icons representing the selection of edge shadow erasing mode described above is positioned basically unchanged compared to the display position in the previous frame.

In the above it was explained that, when, in detail setup frame of FIG. 16C, frame transitional key 125 is operated, the frame once transits to the special function selecting frame of FIG. 16D, then key 126 to cause the transition into the basic frame. However, in the detail setup frame of FIG. 16C, frame switching key 126 can be operated after the edge shadow erasing mode has been set up, so that the view changes directly to the basic frame of FIG. 16E.

Next, besides the selection of the edge shadow erasing mode as explained above, FIGS. 17A to 17D show the transitional steps of the display when another special function, i.e., the dual page copy function is further selected.

Figure 17A:
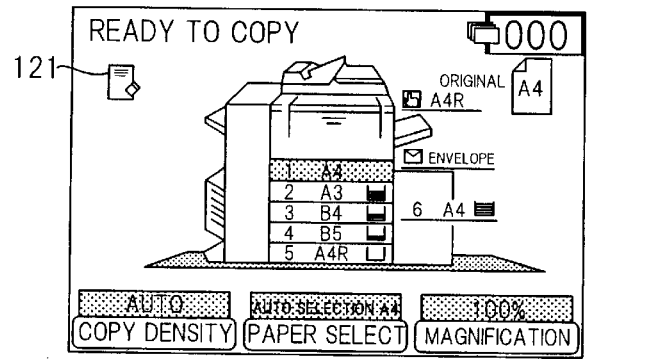
FIGS. 17A to 17D are diagrams showing display changes when a special function, the dual page copy, is selected.
Figure 17B:
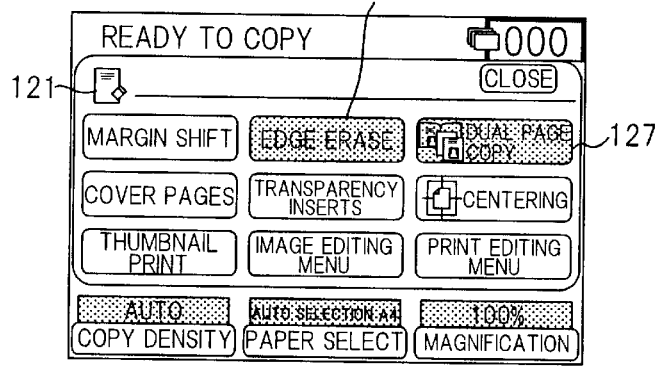
Figure 17C:
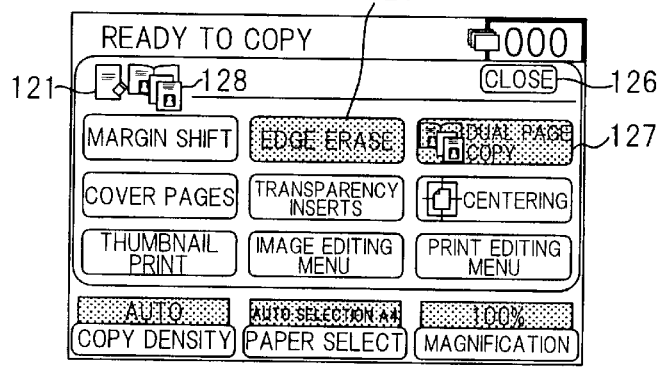

In the state where the basic frame of FIG. 17A is displayed with icon 121 for edge shadow erasing, when special function key 60 on the control panel is operated again, the basic frame of FIG. 17A changes to the special function selecting frame of FIG. 17B. Naturally, since the edge shadow erasing mode has been selected, icon 121 remains being displayed at the predetermined position and edge shadow erasing key 120 remains being reversed. In this state, when dual page copy key 127 in the special functions is operated, the key, i.e., dual page copy key 127 in the special function selecting frame of FIG. 17B becomes reversed, at the same time an icon 128 for the dual page copy mode appears on one side of icons 121 of the edge shadow erasing mode. FIG. 17C shows the special function selecting frame of this state.

In the above case, it has been described that when dual page copy mode is selected, icon 128 appears in the predetermined area with key 127 reversed because this mode does not have any frame for detail setting. However, if there is some frame for detail setting, the frame will appear in a similar manner to the transitional steps of the other frames.

Figure 17D:
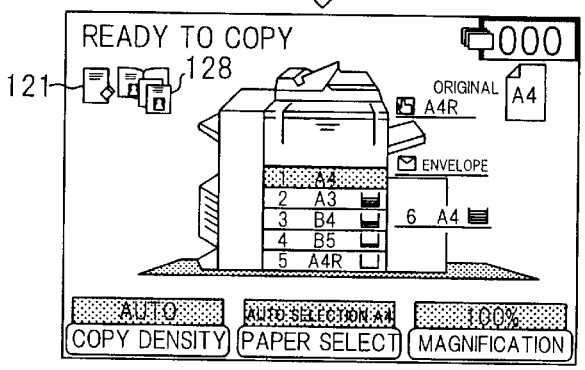

When the mode setup is over, the operator presses key 126 so that the display again returns to the basic frame of FIG. 17D. Also in this case, in the special function selecting frame of FIG. 17C, icon 121 for edge shadow erasing and icon 128 for dual page copy which have been displayed are adapted to be basically unchanged in their displayed position in the basic frame of FIG. 17D.

Next, other features of the embodiment of the invention will be described.

In the description heretofore, an icon which displays the fact that a special function has been selected or set up is shown at the predetermined position in the display portion, and when the icon is directly pressed, the frame for detail setting of the mode indicated by the pressed icon can be re-displayed from any frame. This configuration is provided for checking the icon's meaning should the operator forget it, or for modifying or canceling the setup mode.

For example, when, in the basic frame of FIG. 16E in FIGS. 16A through 16E, or in the special function selecting frame of FIG. 16D, icon 121 for edge shadow erasing, which is displayed on the upper left in the display screen, is pressed, the detailed setup frame of FIG. 16C appears again on the display screen. Therefore, the operator can confirm the current setup conditions, and may modify the setup through the display as required. When the modification of the setup is completed, the only operation needed is to change the current display successively to the basic frame of FIG. 16E.

Referring next to FIGS. 18A to 19C, the way of displaying the icons taking into account of their operability on the control panel will be described. Specifically, the arrangement of displaying the icons on the display screen for informing the operator of the mode which was selected or which is being selected is varied, for example, in accordance with the language displayed on the display screen.

Figure 18A:
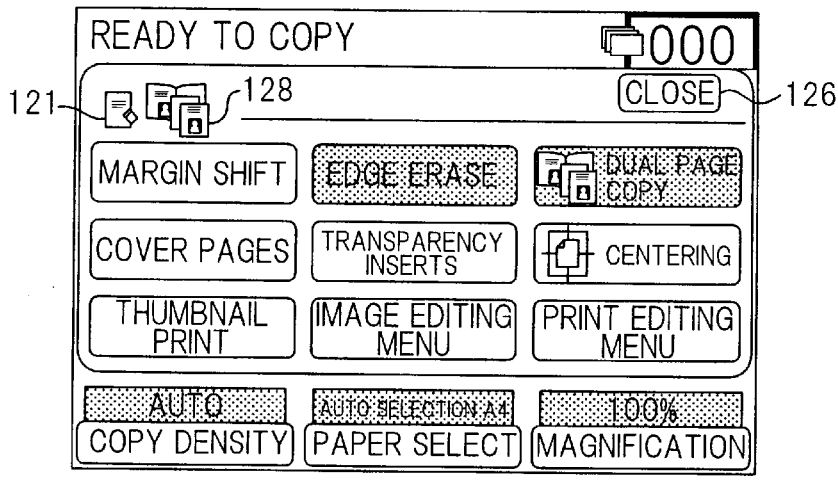
FIGS. 18A to 18C are diagrams of the display showing the alternation of the spacing between icons and the size thereof.
Figure 18B:
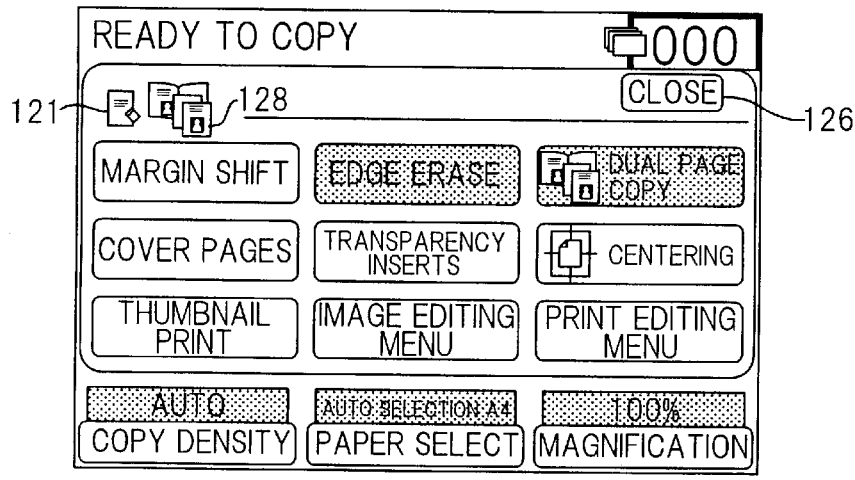
Figure 18C:
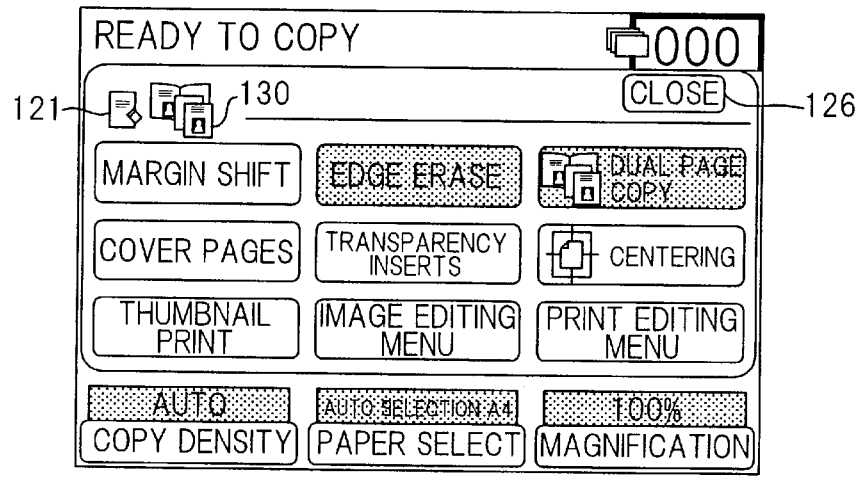
Figure 19A:
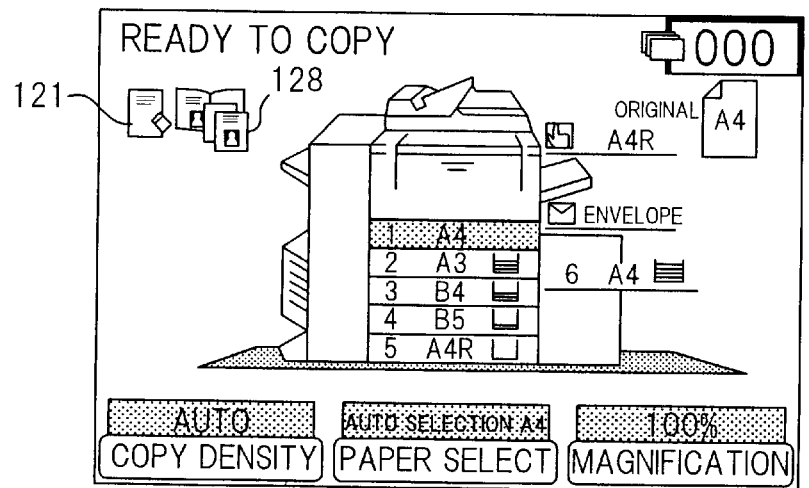
FIGS. 19A to 19C are other diagrams of the display frames showing the alternation of the spacing between icons and the size thereof.

Here, the actual way of displaying the icons will be explained. FIG. 18A and FIG. 19A show standard display frames being originally based on Japanese (here translated into English in the figures). FIGS. 18B and 19B and FIGS. 18C and 19C show display frames based on English. FIG.

Figure 19B:
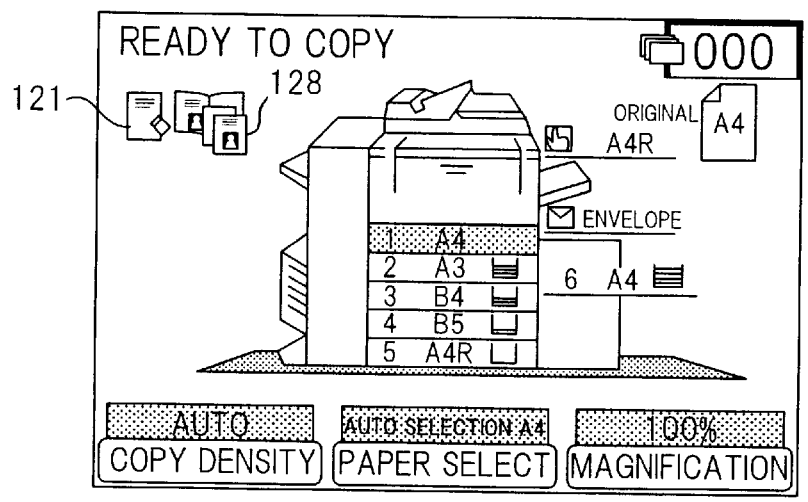
Figure 19C:
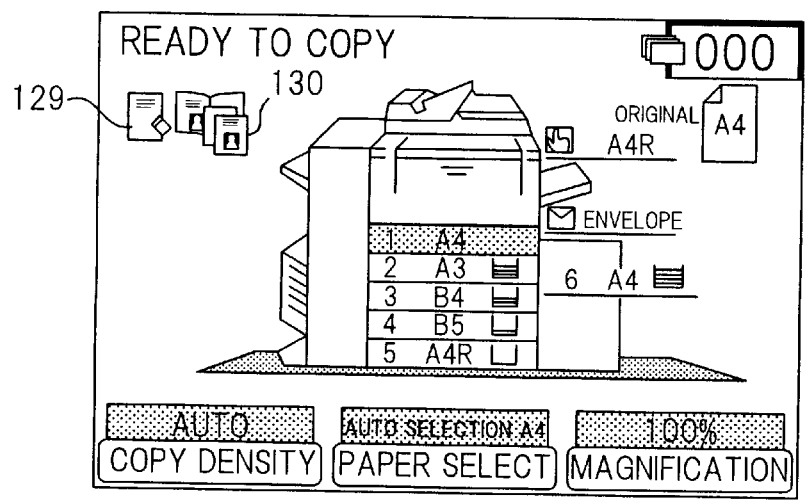

18B and FIG. 19B show the cases in which the spacing between the icons displayed when a plurality of modes are selected is made greater than standard. FIG. 18C and FIG. 19C show the cases in which the sizes of the icons themselves are made larger than standard. In this way, the spacing between icons or the size of icons is changed so as to provide easy viewing as well as easy operability.

The type of user can be inferred based on the kind of the language displayed and hence the sizes of the icons and the spacing between the icons are set appropriately in conformity with the physical features of the user so as to avoid misoperation such as erroneously pressing icons other than the necessary one due to, for example, the size of the operator's finger. Also, misoperation such as touching other areas when people with weak-sight use the system, can be prevented by enlarging the size and spacing so that the icons are easily visible. In this way, it is possible to provide a system easily operated by everybody.

Further, basically, the position of the icons once displayed will not be varied when a plurality of modes have been set up from a variety of modes in the limited display area of the display frame. However, In some cases, although not shown in the drawings, it is possible to display the icons more tightly than standard, within a certain limited range, with the spacing between icons reduced. In this way, it becomes possible to display many icons in the limited display area. As another method, the size of icons can be reduced within a certain limited range.

Further, provided on the lower left in each display frame is a setup checking key 131 as shown in FIG. 20, in order to deal with the case where the meaning of an icon displayed at the predetermined position is forgotten, or when the operator wants to check the contents of the modes currently set up. When this setup checking key 131 is operated, the icons currently displayed and the titles of the functions of the icons, the setup contents and the like are displayed in menu form on the screen.

When the data relating to these icons is displayed in menu form, the listing display is configured so that the menu form of the icons relating to the image editing, which are displayed in the area (the first area) near external outline 102 displayed in the basic frame is arranged separately from the list of the icons relating to the handling of the paper displayed in the area (the second area) laid over the corresponding outline, thus facilitating for the operator to easily check the contents of the modes being set up. Further, the system also permits the setup conditions designated by the icons to be modified or canceled after the modes have been viewed in the above way.

(Description of the control guidance display)

Provided in the upper right part adjacent to the LCD device 56 disposed in more or less the center of control panel 45 shown in FIG. 4 is control guide key 64. When this key 64 is operated by the operator as required, information with images, characters etc., as to the various functions installed in this digital copier 10, such as detailed explanation of the functions, can be obtained.

Under control guide key are a pair of scrolling keys 141 and 142 for scrolling up and down the display of the control guidance information activated by the operation of control guide key 64 and displayed on LCD device 56. In this embodiment, the description will be made of the case where scrolling is limited to the vertical direction, but in some specifications it is possible to provide a configuration having the display scrolled horizontally or both vertically and horizontally.

With this arrangement, the display of the guidance information will be described using an example of the following mode. In practice, the digital copier has various editing functions. Of these functions, there is a mode in which the copy when the spread of a book original is copied, is produced with shadows (black edges) which would arise at the periphery of the copy paper, erased. This mode will be used as the example.

An experienced user who has been accustomed to use the digital copier routinely, can set up the desired mode, following the operation sequences shown in FIGS. 14A to 17D, by direct selection from the layout keys of the functions. Such a user does not need extra operations and can operate the copier correctly in a short period of time. On the contrary, an inexperienced user, using the digital copier in a similar manner will face difficulties, and hence performs mode setting, following the display of mode setting guidance explained below. Thus, it becomes possible for an inexperienced user to set everything in a correct manner, though it takes more time.

Figure 21:
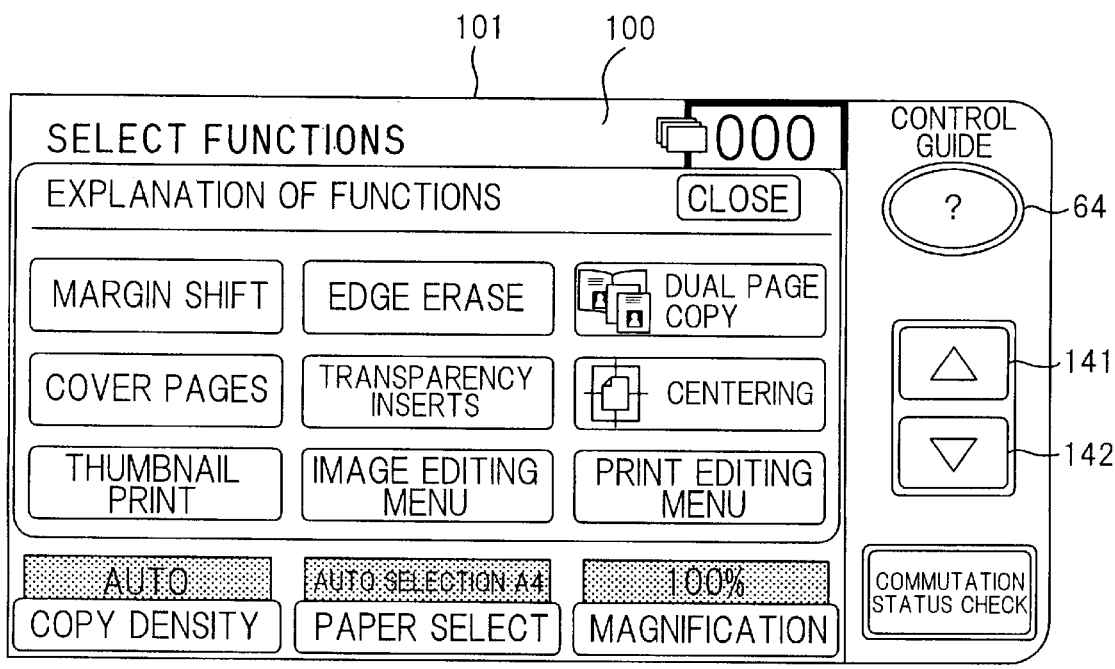
FIG. 21 is a diagram showing a display frame in which a multiple number of editing functions are displayed in menu form.

In the state where digital copier 10 is in the standard mode, control guide key 64 disposed on control panel 45 shown in FIG. 4 is pressed. Then, a menu of various editing functions installed in digital copier 10 is displayed as shown in FIG. 21. With this menu, a message is displayed which instructs the user that a desired editing function should be selected from the editing function menu.

When the operator, viewing this display, touches 'edge shadow erasing' key, the controller recognizes that the edge shadow erasing function was selected based on the current display image information and the positional information from that tablet (transparent touch-panel) 101, and reverses 'edge shadow erasing' key for a short period of time. Thereafter, the guidance information containing this 'edge shadow erasing' function with images is displayed on display portion 100 as shown in FIG. 22A.

Figure 22B:
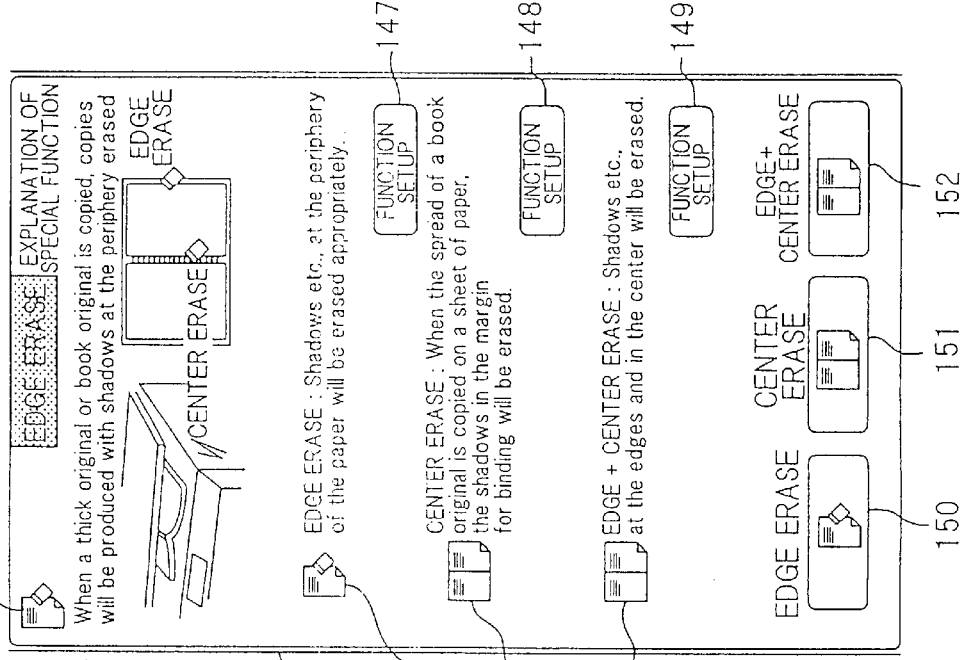
FIGS. 22A and 22B are diagrams showing display frames in which guidance information of the edge erasing function is displayed.
Figure 22A:
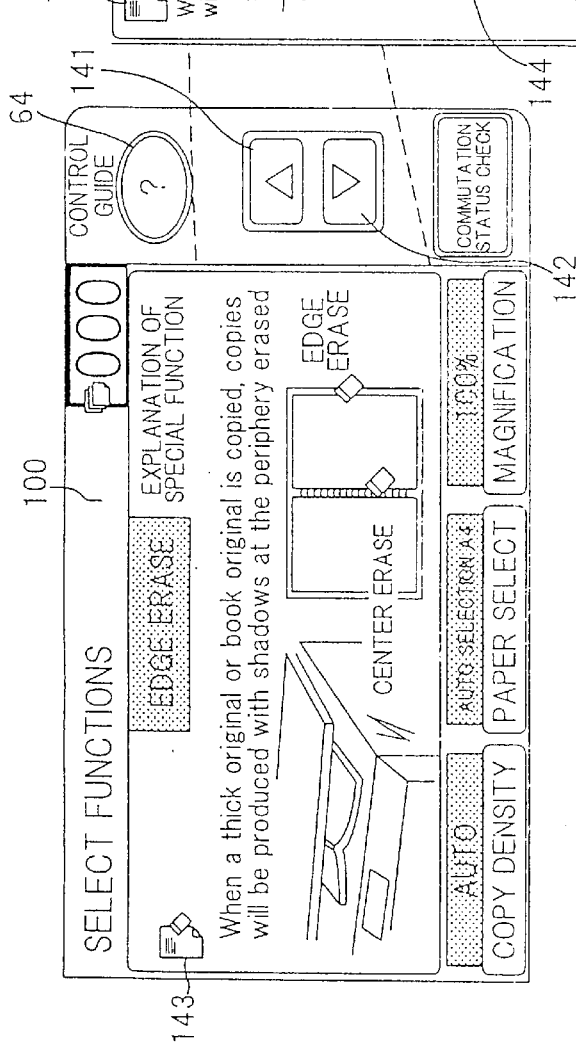

Here, the guidance information displayed in LCD portion 100, has a data amount exceeding the display range of LCD portion 100 as shown in FIG. 22B, so it is impossible to display all the data at one time. To deal with this, the aforementioned display scrolling keys 141 and 142 arranged on the right of LCD portion 100 for scrolling the display in the vertical direction, are used to scroll the display within the display area of LCD portion 100 so that all the control guidance information is displayed.

In this case, the guidance information of the 'edge shadow erasing' function is composed of the overall description of the 'edge shadow erasing' function and the explanation of the three modes of the 'edge shadow erasing' function, and these are displayed. The guidance information includes the guide information for explaining the three mode and also has individual mode selection keys 147, 148 and 149 so that each mode can be selected instantly when the mode explanation has been understood. Therefore, the operator can view the guidance information of each mode and select at that point the desired mode by touching key 147, 148 or 149. Accordingly, it is not necessary to transit to the dedicated display frame for mode selection, providing for a simplified operation.

Further, mode election keys 150, 151 and 152 for enabling mode selection may be displayed on LCD portion 100, as part of the guidance information, at the end of the guidance information containing the mode selection keys. In this case, the operator can select a desired mode after having understood all the mode description.

Moreover, it is also possible to provide a configuration in which, when key 142 for scrolling the guidance information down is continuously operated until the display reaches the end of the guidance information, the display automatically changes into the dedicated frame for mode selection of the guidance information currently displayed (FIG. 14C). Alternatively, it is possible to provide another configuration in which the display changes into the frame for mode selection when key 141 for scrolling the guidance information up is continuously operated until the display reaches the beginning of the guidance information.

Further, it is also possible to provide a configuration so that the mode of which the guidance information is being displayed will be automatically selected without a selecting operation. In this case, the following conditions can be considered for the selection. For example, when a certain period of time has lapsed after the guidance information, of a certain mode, has reached its end and has been displayed, the mode may be automatically selected. It is also possible to select the mode of which the guidance information is displayed in the center of the LCD portion. Alternatively, it is also possible to provide a configuration so that when all the guidance information has been displayed to its end and still key 142 continues to be operated, the mode which resides at the end of the guidance information will be selected.

Returning to the aforementioned topic, when guidance information is displayed on the screen of the LCD portion, icon 143 representing the function is continuously displayed at a predetermined position on the display together with the guidance information, in order that the operator will be able to know the function for which the guidance information is being displayed. In this case, this icon information is kept being displayed at the same position regardless of scrolling when the guidance information is scrolled vertically through scrolling keys 141 and 142.

In this way, the operator can continue to operate while confirming in what mode the copier is currently selected or, in what mode in the 'edge shadow erasing' is selected.

In a particular embodiment, it is possible to display, together with the guidance information, icon images 144, 145 and 146 (FIG. 22B) identical with the icon information which is displayed at the predetermined position in each display frame when the mode is selected.

In this way, since icon images 144, 145 and 146 are provided as the mode selecting keys, when the icon is operated directly by an inexperienced operator, the pattern of the icon's information enables easy recall from the operator's memory the contents of the mode which has been previously understood by reading the descriptive information in the guidance, resulting in easy understanding.

Further, when a mode is selected by an operation as above, icon information 147 representing the selected mode is displayed at that point at the predetermined position in the display frame of the guidance information. This once again imprints on the operator's memory that the mode has been selected and the pattern displayed is the icon representing the selected mode.

When one of the modes is selected and fixed, the icon indicating that the desired mode is selected is displayed at a predetermined position. At the same time, the guidance display mode is automatically canceled so that the display will return to the basic control display (FIG. 17A) maintaining the mode selection state (icon).

Figure 23:
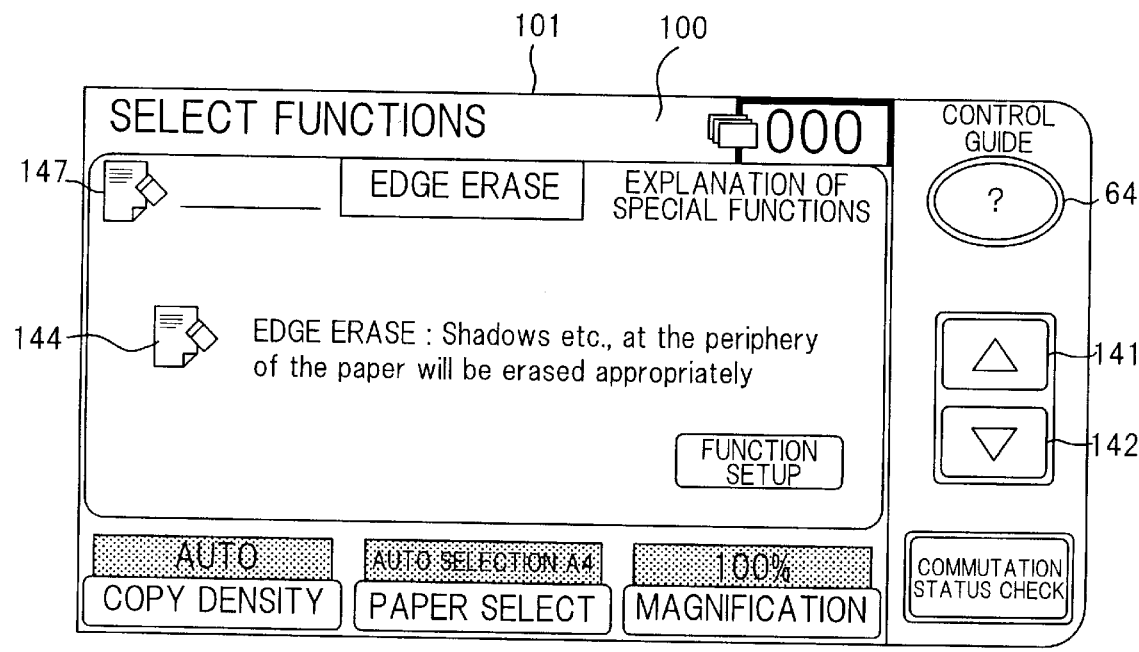
FIGS. 23 is a diagram showing a display frame in which icons after mode selection are displayed.

Some functions may be composed of a plurality of modes. In such a case, if one of the modes has been selected, a further mode change can be designated by scrolling the display of the guidance information as shown in the guidance display information shown in FIG. 23B. Therefore, the display will not return to the basic frame but continue to be unchanged whilst just displaying only the icon at the predetermined position in order to indicate that the mode has been selected. Thus, the frame will not transit immediately, so operability is improved without causing operator confusion.

Moreover, since in some selected modes, detailed conditions can be set up or need to be set up, it is also possible to configure the system so that the display will automatically transit to the input frame for detailed conditions (FIG. 15C) immediately when the mode is selected.

As described heretofore, in accordance with the input device of the invention, the operator can visually grasp the state of the operation and mode, in the light of the actual apparatus configuration, and can visually confirm that the designation has been accepted because the operator's setup is shown on the display.

Further, when the frame content changes, the operator can continuously confirm its setup without moving their view point, and hence is able to visually confirm that their setup from the previous frame is maintained. Thus, the operator can, easily without any feeling of uneasiness, set up the operating conditions of the apparatus through the touch panel which changes its display successively at short intervals.

In accordance with the input device written in the first feature of the invention, when part of the external outline of the copier displayed on the display portion is operated, the display transits to the frame for setting up the mode relating to the selected unit in the copier. Accordingly, the operator can visually recognize the location which the operator wants to operate by referring to the actual machine's configuration.

In accordance with the input device written in the second feature of the invention, when part of the external outline of the apparatus displayed on the display portion is operated, the display changes into the frame for setting the mode, in which the outline of the designated part continues to be displayed while the mode setup menu of the selected unit is displayed on the remaining area. Accordingly, the operator can visually confirm that the designated mode setting of the operator is activated.

In accordance with the input device written in the third feature of the invention, when part of the external outline of the apparatus displayed on the display portion is operated, the display changes into the frame for setting the mode, in which the outline of the designated part continues to be displayed at the current position while the mode setup menu of the selected unit is displayed on the remaining area. Accordingly, the operator can visually confirm the outline of the selected unit without moving their view point, thus avoiding confusion due to change of the display contents.

In accordance with the input device written in the fourth feature of the invention, when part of the external outline of the apparatus displayed on the display portion is operated, the display changes into the frame for setting the mode, in which the outline of the designated part continues to be displayed while the mode setup menu of the selected unit is displayed on the remaining area and the icon representing the selected mode is displayed within the outline of the unit. Accordingly, the operator can visually confirm from the mode setting frame that the mode selected by the operator is set up.

In accordance with the input device written in the fifth feature of the invention, the external outline of the copier is displayed on the display portion, and when a copy mode is selected through the control panel, the icon relating to the selected mode is displayed in an appropriate position of the external outline of the copier. As a result, the operator can visually confirm that the mode input through control panel has been set up.

In accordance with the input device written in the sixth feature of the invention, each mode setup key for designating the operation has an icon representing the mode, and the icon on the selected key is displayed within the external outline. Accordingly, the operator can visually confirm that the mode which is selected through the key has been set up without fail.

In accordance with the input device written in the seventh feature of the invention, when an icon relating to a set up mode is displayed on the display portion within the external outline of a unit, the icon is displayed in the position suitable to the setup mode. For example, if the offset discharging mode is selected, the icon is displayed near the external outline of the finisher unit/offset tray. Thus, the operator can confirm that the operator's designation has been carried over to the mechanism which implements the function.

In accordance with the input device written in the eighth feature of the invention, the icon relating to the setup copy mode is displayed within the external outline of the unit which is being mode selected and a plurality of icons associated with each other are replaced with a single icon. Thus, it is possible to display the setup conditions within a limited display area, without any lack of information.

In accordance with the input device written in the ninth feature of the invention, icons relating to setup copy modes are displayed within the external outline of the unit which is being mode selected and if the icons take up all the space within the external outline, a plurality of icons associated with each other are replaced with a single icon. Thus, it is possible to optimally use the limited display area and still it is possible to reduce the risk of the operator's confusion to as low as possible even when the icons need to be displayed in a compositive manner.

In accordance with the input device written in the tenth feature of the invention, when the operating mode of the selected unit has been designated, the external outline of the selected unit continues to be displayed at the same position while the display changes into the frame that displays the overall external outline of the whole apparatus. Accordingly, the operator will not perceive uneasy visual feeling when the display transits from the frame for mode setting to the frame for the overall external outline.

In accordance with the input device written in the eleventh feature of the invention, when the operating modes of the selected unit have been designated, the external outline of the selected unit and the icon representing the selected mode continue to be displayed at the same positions while the display changes into the frame that displays the overall external outline of the whole apparatus. Accordingly, the operator can view the icon which has been confirmed from the mode setup frame, in the overall external outline of the apparatus without changing their view point, thus easily checking the operator's selected mode even when the display has changed from one to another.

Since the input device written in the twelfth feature includes a first copy mode setting means disposed on the periphery of the external outline of the copier displayed on the display portion and a second copy mode setting means which allows for setting of each mode of the copier by operating part of the external outline of the copier, an experienced operator can implement the mode setting operation directly through the external outline whereas an inexperienced operator who has no knowledge of the direct operation through the external outline can perform the mode setting operation in a manner similar to that of a conventional copier.

In accordance with the input device written in the thirteenth feature of the invention, since the icons representing control commands are displayed in the area near the unit to be controlled (the first display area) and in the area overlapping the external outline thereof (the second display area), the operator can visually confirm the part to be operated and the way of operation and hence grasp the operation content instantaneously, thus achieving improved efficiency of the operation control.

In accordance with the input device written in the fourteenth feature of the invention, since the icons associated with one another are grouped and displayed in either the first or second display area, the operator can make sure they visually and instantaneously grasp the command contents and the correlation therebetween, thus achieving improved efficiency of the operation control.

In accordance with the input device written in the fifteenth feature of the invention, since the icon relating to the command content determined by command content determining means is displayed at the predetermined position and when the display is switched from one frame to another the icon is continued to be displayed in the same state. Therefore, even if the display is switched successively, the icon is kept being displayed so that the operator can visually and instantaneously grasp the process of the control up to the currently displayed frame, thus achieving improved efficiency of the operation control.

In accordance with the input device written in the sixteenth feature of the invention, since the spacing between icons can be changed when the icons are displayed in either the first display area or the second display area, the spacing can be selected so as to make for easy viewing and easy operability, resulting in improved operability.

In accordance with the input device written in the seventeenth feature of the invention, since the size of icons can be changed when the icons are displayed in either the first display area or the second display area, the spacing can be selected so as to make for easy viewing and easy operability, resulting in improved operability.

In accordance with the input device written in the eighteenth feature of the invention, for the icon associated with the operating command content represented by the icon selected by the operator, the operating command contents are displayed on the display device in menu form. Therefore, the operator can check the operating content of the selected icon instantaneously and also the contents of the related icons. As a result, the operator can easily grasp the control content, thus improving the efficiency of the controlling operation.

In accordance with the input device written in the nineteenth feature of the invention, since the display control means is constructed so that the displayed icons are grouped for specific areas and displayed on the display device in menu form, the associated icons are displayed in an ordered manner, allowing the operator to recognize and grasp them easily.

In accordance with the input device written in the twentieth feature of the invention, since the display control means displays the frame for setting up the icon associated with the determined icon, it is possible to display the frame for setting up the icon within any display frame thus making it possible to check the detailed setup conditions represented by the icon.

In accordance with the input device written in the twenty-first through twenty-third features of the invention, since the setting contents of the control commands corresponding to icons can be altered, it is possible to alter the setting contents merely through the icons displayed on the display frame, achieving an improved operability.

In accordance with the input device written in the twenty-fourth feature of the invention, since the conditions of a function are set through selection keys after checking the content of the function using the guidance function and returning to the normal mode setting process, it is possible to confirm the function and set up the conditions of the function immediately after. Accordingly, it is possible for an user, who does not understand how to use the copier very well, to efficiently use the various editing functions installed in the digital copier.

In accordance with the input device written in the twenty-fifth feature of the invention, since the operator can select the function immediately after if the operator, after having viewed the guidance information to its end, has found the function to be needed from the guidance information, the operator no longer needs to enter a special mode setting routine and select the mode and detailed conditions after having viewed the content of the desired function.

Accordingly, it is possible to avoid erroneous setting or operator confusion during setting and select the required mode in an easy and assured manner.

In accordance with the input device written in the twenty-sixth feature of the invention, since the display automatically changes into the function selecting frame when the display of the guidance information has been scrolled to the end, the operator does not need to switch the display after the guidance information has been checked. This results in improvement of the operability.

In accordance with the input device written in the twenty-seventh feature of the invention, since the function as to which the guidance information is being displayed is automatically selected, the operator does not need to switch the display after the guidance information has been checked. This results in improvement of the operability.

In accordance with the input device written in the twenty-eighth feature of the invention, since the icon representing the function is displayed together with the its guidance information when a function has been selected, this configuration helps the operator who needs the guidance to understand and memorize what the icon information indicates even after the display changes to another frame. In particular, since the associated icon continues to be displayed at the predetermined position from when the guidance information of a function is selected to the setting of the function after confirmation of the guidance information, the operator can easily understand and memorize what the icon information indicates.

In accordance with the input device written in the twenty-ninth feature of the invention, since icon information and guidance information are displayed altogether and part of the icon information serves as the mode selection, the effect of the function and what the icon indicates can be easily understood by an inexperienced user.

In accordance with the input device written in the thirtieth and thirty-first features, since the icon information relating to a function which has been selected after viewing of the guidance information will be displayed at the predetermined position on the display frame, the operator can confirm the fact that the mode has been selected, from the frame for displaying guidance and is helped with understanding what the icon indicates.

In accordance with the input device written in the thirty-second and thirty-third features, since the guidance display information and selection key information are displayed during the function selecting stage, and the display will not be transited immediately after the selection of the function, it is possible for an inexperienced user to correctly perform the mode selection without confusion.

In accordance with the input device written in the thirty-fourth feature of the invention, the display is automatically transited into the frame for setting detailed conditions if the selected function needs setting of detailed conditions. Therefore, this configuration provides a control panel which is easy for an inexperienced user to handle.

In accordance with the input device written in the thirty-fifth feature of the invention, the ways of selecting functions include the first function selecting mode in which a desired function is directly selected from the display information of the function menu and the second function selecting mode in which a desired mode is selected after having viewed the guidance information of the function, selected from the display information of the function menu. Therefore, an experienced user who has been accustomed to use the copier routinely can select the desired mode from various functions, correctly and quickly. On the other hand, an inexperienced user can select the desired mode by checking the contents of functions and understanding the mode step by step.

What is claimed is:

1. An input device for controlling an apparatus comprising:

a display means for displaying an image represented by a plurality of dots;

a touch panel means disposed over the display face of the display means for outputting information of a position where the panel is operated in accordance with the displayed image on the display means;

a command content determining means for determining the content of the command selected, based on the relationship between the positional information output from the touch panel means and the image displayed on the display means, wherein the image displayed on the display means comprises an external outline of the apparatus having the input device; and a switching means for switching the display on the display means, into the display frame for setting the operation of a unit corresponding to the operated part of the external outline of the apparatus when part of the external outline of the apparatus displayed on the display portion is operated through the touch panel means.

2. The input device according to claim 1, wherein the switching means is constructed so that when part of the external outline of the apparatus displayed on the display portion is operated through the touch panel means, the outline of the designated part constituting the apparatus continues to be displayed while the display in the display means changes into the display frame for setting the operation mode of the unit corresponding to the operated part of the external outline in the apparatus.

3. The input device according to claim 2, wherein when part of the external outline of the apparatus displayed on the display portion is operated through the touch panel means, the outline of the designated part constituting the apparatus continues to be displayed while the display in the display means changes into the display frame for setting the operation mode of the unit corresponding to the operated part of the external outline in the apparatus.

4. The input device according to claim 2, further comprising a display indicating means which, when the operation of the part of the unit displayed on the display means is designated, displays the icon representing the designated mode, within the outline of the unit displayed on the display means or in the vicinity thereto.

5. An input device for controlling an apparatus comprising:

a display means for displaying an image represented by a plurality of dots;

an operation command inputting means for inputting commands relating to the operation; and a display control means for displaying the command input through the operation command inputting means, on the display means so that the command can be confirmed, wherein the image displayed on the display means comprises an external outline of the apparatus having the input device, and in accordance with the command relating to the operation, input through the operation command inputting means, the mode's icon relating to the designated operation is displayed within the outline of the unit displayed on the display means or in the vicinity thereto.

6. The input device according to claim 5, wherein the means for inputting a commands relating to an operation comprises an icon representing the operation, and when the means for inputting the command relating to the operation is operated, the same icon representing the operation is displayed within the outline of the unit displayed on the display means or in the vicinity thereto.

7. The input device according to claim 5, wherein when an icon relating to a mode is displayed on the display means within the external outline or in the vicinity thereto, the icon is displayed in the position suitable to the mode, within the external outline.

8. The input device according to claim 5, wherein when the operation relating to a unit of the apparatus displayed on the display means is designated, the icon representing the setup mode is displayed within the outline of the unit displayed on the display means or in the vicinity thereto and if a plurality of icons representing the setup modes associated with each other need to be displayed, the associated icons are replaced with a single icon.

9. The input device according to claim 5, wherein when the operation relating to a unit of the apparatus displayed on the display means is designated, the icon representing the setup mode is displayed within the outline of the unit displayed on the display means or in the vicinity thereto; and when a plurality of icons representing the setup modes are displayed beyond the predetermined display area within the outline or in the vicinity thereto, icons of the modes associated with each other of the plurality of the icons are replaced with another single icon.

10. The input device according to claim 2, wherein when the operating conditions of the part of the apparatus displayed on the display means have been designated, the external outline of the part of the apparatus displayed on the display means continues to be displayed at the same position while display changes into the frame that displays the overall external outline of the whole apparatus.

11. The input device according to claim 2, wherein when the operating conditions of the part of the apparatus displayed on the display means have been designated, the external outline of the part of the apparatus displayed on the display means and the icon representing the selected mode continue to be displayed at the same positions while display changes into the frame that displays the overall external outline of the whole apparatus.

12. An input device for controlling an apparatus comprising:

a display means for displaying an image represented by a plurality of dots;

a touch panel means disposed over the display face of the display means for outputting information of a position where the panel is operated in accordance with the displayed image on the display means; and a command content determining means for determining the content of the command selected, based on the relationship between the positional information output from the touch panel means and the image displayed on the display means, wherein the image displayed on the display means comprises an external outline of the apparatus having the input device;

a first switching means which has an input portion disposed on the periphery of the external outline of the apparatus displayed on the display portion, and when the input portion is operated, switches the display on the display means into the display frame for setting the operation of a unit corresponding to the operated part in the input portion; and a second switching means for switching the display on the display means, into the display frame for setting the operation of a unit corresponding to the operated part of the external outline of the apparatus when part of the external outline of the apparatus displayed on the display portion is operated through the touch panel means.

13. A display input control system comprising:

a display device for displaying an image composed of an external outline of an apparatus to be operated, command keys for designating operating commands and icons representing the command contents of the control operations;

a position detecting device for detecting the designated position when the image displayed on the display device is operated by an operator; and a controller for displaying a predetermined frame on the display device, said controller comprising:

an image determining means for determining the image displayed on the designated position from the positional information output from the position detecting means;

a command content determining means for determining the content of the control operation for the designated image; and a display control means for displaying the icon corresponding to the command content determined by the command content determining means, either in the first display area which is in the vicinity of the external outline of the portion relating to the command content, or in the second display area which is in the external outline thereof.

14. The display input control device according to claim 13, wherein the display control means, in accordance with the command contents for icons, displays the icons relating to the command contents, altogether in the first or second display area.

15. The display input control device according to claim 13, wherein the display control means effects control so that the icon relating to the command content determined by command content determining means is displayed at the predetermined position and if the display is switched from one frame to another for each control operation the icon is continued to be displayed in the same state before and after the switching of the display.

16. The display input control device according to claim 13, wherein the display control means is constructed so that the spacing between icons can be changed.

17. The display input control device according to claim 13, wherein the display control means is constructed so that the size of icons can be changed.

18. The display input control device according to claim 13, wherein the display control means is constructed so that the displayed icons and the command contents represented by the icons are displayed in menu form.

19. The display input control device according to claim 18, wherein the display control means is constructed so that the displayed icons are grouped for individual areas and displayed on the display device in menu form.

20. The display input control device according to claim 13, wherein the image determining means determines the icon detected by the position detecting means; the command content determining means determines the control command content associated with the determined icon; and the display control means displays the frame for setting up the conditions of the command corresponding to the determined icon.

21. The display input control device according to claim 13, wherein the display control means further comprises a control command modifying means for modifying the set up contents of control commands corresponding to icons.

22. The display input control device according to claim 18, wherein the display control means further comprises a control command modifying means for modifying the set up contents of control commands corresponding to icons.

23. The display input control device according to claim 19, wherein the display control means further comprises a control command altering means for altering the set up contents of control commands corresponding to icons.

24. A display input control device comprising:
a display means for displaying display image information represented by a plurality of dots;
a position detecting means for detecting the operated position when the image displayed on the display device is operated by an operator; and
a command content determining means for determining the content of the control command based on the relationship between the display image information and the information of the operated position, wherein the display image information displayed on the display means comprises guidance information relating to a function and the guidance information displayed on the display means contains the displayed information for selection keys which enable the selection of a function which can be obtained from the guidance information.

25. The display input control device according to claim 24, wherein the display information for selection keys is displayed at the end of the guidance information.

26. The display input control device according to claim 24, further comprising a display frame scrolling means for scrolling the display image information displayed on the display frame of the display means, in the predetermined direction, wherein when the guidance information has been scrolled to the end by the display frame scrolling means, the display automatically changes to the function selecting frame.

27. The display input control device according to claim 24, further comprising a display frame scrolling means for scrolling the display image information displayed on the display frame of the display means, in the predetermined direction, wherein the function as to which the guidance information is being displayed on the display means is automatically selected by the display frame scrolling means.

28. The display input control device according to claim 24, wherein when a function is selected from a plurality of different functions, the icon representing that the function is being selected is displayed at the predetermined position on the display frame of the display means, and at the same time the guidance information of the function is displayed.

29. A display input control device comprising:
a display means for displaying display image information represented by a plurality of dots;
a position detecting means for detecting the operated position when the image displayed on the display device is operated by an operator; and
a command content determining means for determining the content of the control command based on the relationship between the display image information and the information of the operated position, wherein the display image information displayed on the display means comprises guidance information relating to a function and the icon representing the function associated with the guidance information, and the function can be selected by operating the icon.

30. The display input control device according to claim 28, wherein the display of the icon representing the function, displayed with the guidance information is transferred to the predetermined display area when the function is selected on the display frame.

31. The display input control device according to claim 29, wherein the display of the icon representing the function, displayed with the guidance information is transferred to the predetermined display area when the function is selected on the display frame.

32. The display input control device according to claim 24, wherein when the display image information displayed on the display frame of the display means contains plural pieces of guidance display information relating to different functions and selecting key information representing the functions, the display frame is changed in part so as to display the fact that the function has been selected instead of changing the whole display into another when one of the functions is selected by operation of the selection key.

33. The display input control device according to claim 29, wherein when the display image information displayed on the display frame of the display means contains plural pieces of guidance display information relating to different functions and selecting key information representing the functions, the display frame is changed in part so as to display the fact the function has been selected instead of changing the whole display into another when one of the functions is selected by operation of the selection key.

34. The display input control device according to claim 29, wherein when, with the guidance information being displayed on the display frame of the display means, the function has been selected, the display frame for guidance information is changed into the frame for setting up the detailed conditions of the function if extra setting of detailed conditions is needed for the selected function.

35. A display input control device comprising:
a display means for displaying display image information represented by a plurality of dots;
a position detecting means for detecting the operated position when the image displayed on the display device is operated by an operator; and
a command content determining means for determining the content of the control command based on the relationship between the display image information and the information of the operated position, wherein the display image information displayed on the display means comprises information of functions displayed in menu form and the ways of selecting functions include the first function selecting mode in which a desired function is directly selected from the display information of the function menu and the second function selecting mode in which a desired mode is selected after having viewed the guidance information of the function, selected from the display information of the function menu.

* * * * *